United States Patent
Takahashi et al.

(10) Patent No.: US 10,076,932 B2
(45) Date of Patent: Sep. 18, 2018

(54) MULTILAYERED STRUCTURE, INNER LINER HAVING THE SAME, AND PNEUMATIC TIRE

(75) Inventors: Yuwa Takahashi, Tokyo (JP); Shinji Tai, Kurashiki (JP); Masao Hikasa, Kurashiki (JP); Hideki Kitano, Kodaira (JP); Tetsuo Amamoto, Kodaira (JP); Takatsugu Tanaka, Kodaira (JP)

(73) Assignees: Kuraray Co., Ltd., Kurashiki-shi, Okayama (JP); BRIDGESTONE CORPORATION, Tokyo (JP)

( * ) Notice: Subject to any disclaimer, the term of this patent is extended or adjusted under 35 U.S.C. 154(b) by 769 days.

(21) Appl. No.: 13/877,126

(22) PCT Filed: Nov. 30, 2010

(86) PCT No.: PCT/JP2010/071411
§ 371 (c)(1),
(2), (4) Date: Mar. 29, 2013

(87) PCT Pub. No.: WO2012/042679
PCT Pub. Date: Apr. 5, 2012

(65) Prior Publication Data
US 2013/0186539 A1 Jul. 25, 2013

(30) Foreign Application Priority Data
Oct. 1, 2010 (JP) .................. 2010-224373

(51) Int. Cl.
*B60C 1/00* (2006.01)
*C08G 18/69* (2006.01)
(Continued)

(52) U.S. Cl.
CPC ............ *B60C 1/0008* (2013.01); *B32B 25/16* (2013.01); *B32B 27/08* (2013.01); *B32B 27/18* (2013.01);
(Continued)

(58) Field of Classification Search
CPC .................. B60C 1/0008; B60C 2005/145
See application file for complete search history.

(56) References Cited

U.S. PATENT DOCUMENTS 5,992,486 A * 11/1999 Katsuki ................. B60C 1/0008
152/510
6,503,588 B1 * 1/2003 Hayashi ................. B32B 27/30
428/215
(Continued)

FOREIGN PATENT DOCUMENTS

CN 1464883 A 12/2003
EP 1728824 A2 12/2006
(Continued)

OTHER PUBLICATIONS

Machine translation of JP2002-052904 (no date).*
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

A multilayered structure having a layer A constituted with a resin composition containing a gas barrier resin, and a layer B being adjacent to the layer A and being constituted with a resin composition containing an elastomer. The total number of the layer A and the layer B is at least 7. The average thickness of the layer A in terms of a single layer is no less than 0.001 μm and no greater than 10 μm, and the average thickness of the layer B in terms of a single layer is no less than 0.001 μm and no greater than 40 μm. The multilayered structure is formed by irradiating with an active energy ray. Furthermore, an inner liner having the multilayered structure, and a pneumatic tire provided with the inner liner are provided.

18 Claims, 1 Drawing Sheet

(51) Int. Cl.
*C08G 18/08* (2006.01)
*C08G 18/42* (2006.01)
*B32B 27/28* (2006.01)
*B32B 27/30* (2006.01)
*B32B 25/16* (2006.01)
*B32B 27/08* (2006.01)
*B32B 27/18* (2006.01)
*B32B 27/32* (2006.01)
*B32B 27/34* (2006.01)
*B32B 27/36* (2006.01)
*B32B 27/40* (2006.01)
*B60C 5/14* (2006.01)

(52) U.S. Cl.
CPC ............. *B32B 27/28* (2013.01); *B32B 27/30* (2013.01); *B32B 27/302* (2013.01); *B32B 27/304* (2013.01); *B32B 27/306* (2013.01); *B32B 27/32* (2013.01); *B32B 27/322* (2013.01); *B32B 27/327* (2013.01); *B32B 27/34* (2013.01); *B32B 27/36* (2013.01); *B32B 27/40* (2013.01); *C08G 18/0895* (2013.01); *C08G 18/4238* (2013.01); *C08G 18/4283* (2013.01); *C08G 18/69* (2013.01); *B60C 2005/145* (2013.01); *C08G 2380/00* (2013.01); *Y10T 428/24967* (2015.01); *Y10T 428/24975* (2015.01)

(56) References Cited

U.S. PATENT DOCUMENTS

| | | | |
|---|---|---|---|
| 6,579,601 | B2 | 6/2003 | Kollaja et al. |
| 6,582,786 | B1 | 6/2003 | Bonk et al. |
| 2004/0096683 | A1 | 5/2004 | Ikeda et al. |
| 2004/0126524 | A1 | 7/2004 | Longo et al. |
| 2004/0204530 | A1* | 10/2004 | Masuda ............... C08L 51/006 524/474 |
| 2005/0090616 | A1 | 4/2005 | Dias et al. |
| 2011/0024015 | A1* | 2/2011 | Takahashi ............ B60C 1/0008 152/510 |

FOREIGN PATENT DOCUMENTS

| | | | |
|---|---|---|---|
| EP | 1825998 | A1 | 8/2007 |
| JP | 6-40207 | A | 2/1994 |
| JP | 7-40702 | A | 2/1995 |
| JP | 7-81306 | A | 3/1995 |
| JP | 10-29407 | A | 2/1998 |
| JP | H11-320741 | A | 11/1999 |
| JP | 2000-108256 | A | 4/2000 |
| JP | 2002-52904 | A | 2/2002 |
| JP | 2002052904 | A * | 2/2002 ............... B60C 5/14 |
| JP | 2002-524317 | A | 8/2002 |
| JP | 2003-512201 | A | 4/2003 |
| JP | 2003-231715 | A | 8/2003 |
| JP | 2004-002791 | A | 1/2004 |
| JP | 2006-188710 | A | 7/2006 |
| JP | 2006-233222 | A | 9/2006 |
| JP | 2006-272569 | A | 10/2006 |
| JP | 2007-021850 | A | 2/2007 |
| JP | 2007-509778 | A | 4/2007 |
| JP | 2007-160899 | A | 6/2007 |
| JP | 2008-247030 | A | 10/2008 |
| JP | 2009-263653 | A | 11/2009 |
| WO | 00/15067 | A1 | 3/2000 |
| WO | 01/28769 | A1 | 4/2001 |
| WO | 2005/044557 | A1 | 5/2005 |
| WO | 2007/037541 | A1 | 4/2007 |
| WO | 2007/083785 | A1 | 7/2007 |
| WO | 2009/123229 | A1 | 10/2009 |

OTHER PUBLICATIONS

Extended European Search Report and Written Opinion dated Apr. 4, 2014 in corresponding European Patent Application No. 10857892.3.

Communication dated Dec. 21, 2016 from the European Patent Office in counterpart Application No. 10 857 892.3.

* cited by examiner

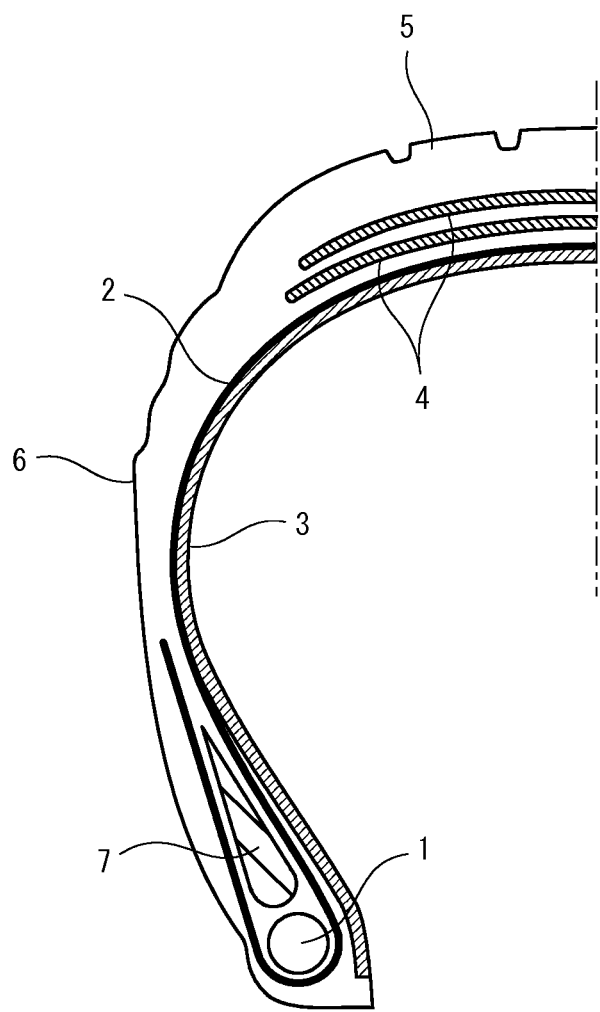

MULTILAYERED STRUCTURE, INNER LINER HAVING THE SAME, AND PNEUMATIC TIRE

This is a National Stage of Application No. PCT/JP2010/071411 filed Nov. 30, 2010, claiming priority based on Japanese Patent Application No. 2010-224373 filed Oct. 1, 2010, the contents of all of which are incorporated herein by reference in their entirety.

TECHNICAL FIELD

The present invention relates to a multilayered structure having at least 7 layers, an inner liner for pneumatic tires having the same, and a pneumatic tire provided with the inner liner.

BACKGROUND ART

Conventionally, laminated films having an ethylene-vinyl alcohol copolymer layer have been used in applications such as packaging materials for food, medical applications and the like, taking advantages of their superior gas barrier properties, thermoformability and the like. Recently, for the purpose of improving various types of performances such as gas barrier properties, various multilayered structures have been proposed in which a plurality of resin-layers are laminated, each layer having a thickness of micron or submicron order.

Conventional multilayered structures developed so far in which a plurality of resin-layers of an ethylene-vinyl alcohol copolymer are laminated include, for example: (1) elastomeric barrier films in which layers of a microlayer polymer composite constituted with a barrier material such as an ethylene-vinyl alcohol copolymer, and an elastomer material such as thermoplastic polyurethane are laminated (see, for example, Patent Documents 1 and 2); (2) multilayer films alternately including layers of a hard polymer material such as an ethylene-vinyl alcohol copolymer and a plastic polymer material (see, for example, Patent Document 3), and the like.

However, according to the aforementioned conventional multilayered structure (1), inter layer adhesiveness between a barrier material such as an ethylene-vinyl alcohol copolymer and an elastomer material such as thermoplastic polyurethane is not considered in particular. In addition, also according to the aforementioned conventional multilayered structure (2), the hard polymer material per se such as an ethylene-vinyl alcohol copolymer, and combination of the same with the plastic polymer material, and the like are not investigated in connection with the inter layer adhesiveness, but only a technique of strengthening the adhesiveness between each layer using a joining layer merely consisting of a hot melt adhesive is disclosed. Therefore, according to these conventional multilayered structure (1) and multilayered structure (2), the inter layer adhesiveness is insufficient, and due to delamination between layers and the like, cracks are likely to be generated on the barrier layer, whereby durability may be deteriorated. As a result, gas barrier properties are insufficient according to the conventional multilayered structures (1) and (2) in applications for which superior gas barrier properties are required, leading to the disadvantages of difficulty in use.

On the other hand, inner faces of pneumatic tires are provided with an inner liner layer constituted with a butyl rubber having low gas-permeability such as a butyl rubber or a halogenated butyl rubber as a principal component is conventionally provided for preventing air leakage and maintaining the air pressure of the tire at a constant level. However, when the content of such a butyl rubber is increased, the strength is decreased due to an unvulcanized rubber, whereby cleavage of the rubber, perforation of the sheet, and the like are likely to be caused. Particularly, when gauge reduction of the inner liner is carried out, disadvantages of exposure of the code provided on the inner face being likely to occur in manufacturing tires are caused.

Therefore, the content of the butyl rubber is limited per se, and when a rubber composition containing the butyl rubber is used, it is necessary for the inner liner layer to have a thickness of about 1 mm in light of air barrier properties. Therefore, the mass of the inner liner layer in the tire accounts for about 5%, thereby hampering improvement of the fuel efficiency of automobiles by decreasing the weight of tires.

Thus, taking into consideration social demands for energy saving in recent years, for the purpose of reduction in weight of automobile tires, a procedure for the gauge reduction of inner liner layers has been proposed. In exemplary procedures developed as such a procedure, a nylon film layer or a vinylidene chloride layer is used as an inner liner layer, in place of conventional butyl rubbers (for example, see Patent Documents 4 and 5). In addition, a procedure in which a film of a composition containing a thermoplastic resin such as a polyamide resin or a polyester resin blended with an elastomer is used as an inner liner layer was also developed (for example, see Patent Document 6).

However, although the weight of tire can be reduced to some extent according to such a method in which these films are used, the method may be accompanied by a disadvantage of inferior crack resistance and/or resistance to fatigue from flexing when used at low temperatures of no greater than 5° C. in particular as compared with the case of commonly used butyl rubber blend composition layers, due to the matrix being a crystalline resinous material, and manufacturing of tires additionally involves complicated steps.

On the other hand, ethylene-vinyl alcohol copolymers are superior in gas barrier properties as described above. Since the ethylene-vinyl alcohol copolymer has an air permeation rate of no greater than one hundredth of that of inner liner rubber compositions containing a butyl rubber, a capacity of maintaining internal pressure can be significantly improved even if the thickness is no greater than 50 μm, whereby reduction in weight of tires is enabled. Therefore, it is efficacious to use an ethylene-vinyl alcohol copolymer for inner liners of tires in order to reduce air permeability of pneumatic tires, and thus a pneumatic tire having a tire inner liner constituted with an ethylene-vinyl alcohol copolymer was developed (for example, see Patent Document 7).

However, although a great effect of improving the capacity of maintaining internal pressure may be achieved in the case in which the ethylene-vinyl alcohol copolymer is used as an inner liner, due to a significantly high modulus of elasticity as compared with rubbers commonly used for tires, leading to inferior flex resistance, fracture and/or crack may be generated as a result of deformation upon flexion. Accordingly, in the case in which an inner liner formed from an ethylene-vinyl alcohol copolymer is used, a capacity of maintaining internal pressure before using the tire is greatly improved; however, the capacity of maintaining internal pressure may be reduced in the tire after use subjected to flexion deformity during rotation of the tire, as compared with before use thereof.

In order to solve the problem, an inner liner for an inner face of tires produced using a resin composition constituted with, for example, 60 to 99% by weight of an ethylene-vinyl alcohol copolymer having an ethylene content of 20 to 70 mol % and a degree of saponification of no less than 85%, and 1 to 40% by weight of a hydrophobic plasticizer was developed (for example, see Patent Document 8); however, flex resistance of the inner liner is not necessarily satisfactory.

Therefore, development of a multilayered structure which can be suitably used for inner liner for pneumatic tires, and the like, has been desired that has high-level flex resistance while maintaining superior gas barrier properties, and that allows for reduction in thickness.

PRIOR ART DOCUMENTS

Patent Documents

Patent Document 1: Japanese Unexamined Patent Application (Translation of PCT Application), Publication No. 2002-524317
Patent Document 2: Japanese Unexamined Patent Application (Translation of PCT Application), Publication No. 2007-509778
Patent Document 3: Japanese Unexamined Patent Application (Translation of PCT Application), Publication No. 2003-512201
Patent Document 4: Japanese Unexamined Patent Application, Publication No. H7-40702
Patent Document 5: Japanese Unexamined Patent Application, Publication No. H7-81306
Patent Document 6: Japanese Unexamined Patent Application, Publication No. H10-29407
Patent Document 7: Japanese Unexamined Patent Application, Publication No. H6-40207
Patent Document 8: Japanese Unexamined Patent Application, Publication No. 2002-52904

SUMMARY OF THE INVENTION

Problems to be Solved by the Invention

The present invention was made in view of these circumstances, and an object of the invention is to provide a multilayered structure that is superior in gas barrier properties and flex resistance and that allows for reduction in thickness, an inner liner having the same, and a pneumatic tire provided with the inner liner.

Means for Solving the Problems

The present inventors thoroughly investigated and consequently found that the object described above can be attained by a multilayered structure: having at least 7 layers in total which include a layer being constituted with a resin composition containing a gas barrier resin and having a specified thickness, and a layer being constituted with a resin composition containing an elastomer and having a specified thickness; and being formed by irradiating with an active energy ray. The present invention was accomplished based on such a finding.

More specifically, an aspect of the present invention provides a multilayered structure having
a layer A constituted with a resin composition containing a gas barrier resin, and a layer B being adjacent to the layer A and being constituted with a resin composition containing an elastomer,
the total number of the layer A and the layer B being at least 7,
an average thickness of the layer A in terms of a single layer being no less than 0.001 µm and no greater than 10 µm, and an average thickness of the layer B in terms of a single layer being no less than 0.001 µm and no greater than 40 µm, and
the multilayered structure being formed by irradiating with an active energy ray.

Due to having a layer A constituted with a resin composition containing a gas barrier resin, the multilayer structure has superior gas barrier properties. In addition, since the layer A having a specified thickness and the layer B constituted with a resin composition containing an elastomer are laminated in the multilayered structure, ductility as a whole can be improved even if the gas barrier resin itself has low ductility. Therefore, the multilayered structure is superior in ductility, and can exhibit superior flex resistance. Therefore, the multilayered structure can maintain characteristics such as superior gas barrier properties even when used with deformation upon flexion or the like. Furthermore, since the multilayered structure is formed by irradiating with an active energy ray, inter layer adhesiveness is increased, and gas barrier properties and flex resistance can be improved. In addition, since the multilayered structure has the layer A and the layer B that are thin layers having a specified average thickness, reduction in thickness and reduction in weight are enabled.

The layer A and the layer B are preferably alternately laminated. By thus alternately laminating the layer A and the layer B, each inter layer formed by lamination can achieve the aforementioned superior adhesiveness. As a result, inter layer adhesiveness of the multilayered structure, in turn, gas barrier properties, flex resistance, and the like can be significantly improved.

The thickness of the multilayered structure is preferably no less than 0.1 µm and no greater than 1,000 µm. When the thickness of the multilayered structure falls within the above range, applicability to various types of intended use such as inner liners can be maintained, whereas irradiation efficiency of a favorable active energy ray can be achieved, whereby inter layer adhesiveness is increased, and gas barrier properties, flex resistance and the like can be further improved.

The elastomer is preferably at least one selected from the group consisting of a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer and a fluorine contained resin based elastomer. When any one of the above polymers is used as the elastomer, the stretchability of the inner liner can be effectively increased, whereby further improvement of the flex resistance is enabled.

In the multilayered structure, it is preferred that the resin composition in at least one of the layer A and the layer B contains a metal salt, and that the content of the metal salt is no less than 1 ppm by mass and no greater than 10,000 ppm by mass in a value of metal element. According to the multilayered structure, adhesiveness to other adjacent layer is further improved due to the metal salt included in a certain amount in the resin composition, and thus gas barrier properties and flex resistance can be further improved.

It is preferred that the resin composition in at least one of the layer A and the layer B contains a radical cross-linking agent, and the content of the radical cross-linking agent with respect to the resin composition before irradiation with an active energy ray is no less than 0.01% by mass and no greater than 10% by mass. According to the multilayered structure, chemical bonds are generated between layers owing to the cross-linking agent by irradiating the multilayered structure having layers constituted with the resin composition containing the radical cross-linking agent with an active energy ray, whereby the inter layer adhesiveness can be further enhanced. As a result, gas barrier properties, flex resistance and the like of the multilayered structure can be further improved. Furthermore, due to containing the radical cross-linking agent in the resin composition, the amount of the active energy ray irradiated can be reduced, and thus the productivity can be improved.

The gas barrier resin is preferably an ethylene-vinyl alcohol copolymer (herein after, may be also referred to as "EVOH"). Use of EVOH as a resin having gas barrier properties enables the gas barrier properties of the multilayered structure to be further improved.

The content of ethylene units of the ethylene-vinyl alcohol copolymer is preferably no less than 3 mol % and no greater than 70 mol %. When the content of ethylene units of the EVOH falls within the above range, the gas barrier properties of the multilayered structure are improved, and additionally melt formability can be improved, whereby improvement of the inter layer adhesiveness is enabled owing to the superior melt formability.

The ethylene-vinyl alcohol copolymer preferably has a degree of saponification of no less than 80 mol %. When the degree of saponification of the EVOH falls within the above range, the gas barrier properties of the multilayered structure can be further improved, and additionally the inter layer adhesiveness with the layer B can be improved.

It is preferred that the ethylene-vinyl alcohol copolymer includes at least one selected from the group consisting of the following structural units (I) and (II), and that the content of the structural unit (I) or (II) with respect to the entire structural units is no less than 0.5 mol % and no greater than 30 mol %.

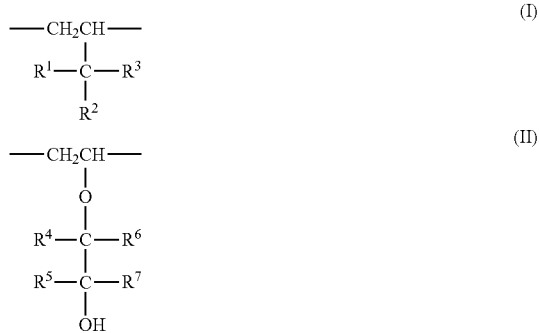

In the above formula (I), $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein two among $R^1$, $R^2$ and $R^3$ may bind with one another unless the two among $R^1$, $R^2$ and $R^3$ both represent a hydrogen atom, and wherein the aliphatic hydrocarbon group having 1 to 10 carbon atoms, the alicyclic hydrocarbon group having 3 to 10 carbon atoms or the aromatic hydrocarbon group having 6 to 10 carbon atoms may have a hydroxyl group, a carboxyl group or a halogen atom.

In the formula (II), $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein $R^4$ and $R^5$ or $R^6$ and $R^7$ may bind with one another unless both $R^4$ and $R^5$ or both $R^6$ and $R^7$ represent a hydrogen atom, and wherein the aliphatic hydrocarbon group having 1 to 10 carbon atoms, the alicyclic hydrocarbon group having 3 to 10 carbon atoms or the aromatic hydrocarbon group having 6 to 10 carbon atoms may have a hydroxyl group, an alkoxy group, a carboxyl group or a halogen atom.

When the EVOH in the layer A has the structural unit (I) or (II) at a content within the above range, flexibility and processing characteristics of the resin composition constituting the layer A are improved, and the inter layer adhesiveness, flex resistance, thermoformability and the like of the multilayered structure can be improved.

The active energy ray is preferably an electron beam. When an electron beam is used as the active energy ray, an inter layer cross-linking reaction is further promoted, whereby inter layer adhesiveness of the multilayered structure can be further improved.

The electron beam is preferably irradiated by an electron beam accelerator at an accelerating voltage of no less than 100 kV and no greater than 500 kV, and at an irradiation dose of no less than 5 kGy and no greater than 600 kGy. When the electron beam is irradiated under the condition described above, the cross-linking reaction more effectively proceeds, and the inter layer adhesiveness of the multilayered structure can be further enhanced.

According to the multilayered structure, inter layer peel resistance as determined after heating at 180° C. for 15 min, by a T-shape peel test in accordance with JIS-K6854 at 23° C. in an atmosphere of 50% RH, at a tension rate of 50 mm/min is preferably no less than 25 N/25 mm. Due to the multilayered structure having such superior inter layer adhesiveness, superior flex resistance and gas barrier properties after flexion are provided, and thus the multilayered structure can be suitably used for inner liners for pneumatic tires, and the like.

In the inner liner for pneumatic tires of the present invention, the multilayered structure is used. Due to the inner liner in which the multilayered structure is used, superior gas barrier properties and flex resistance are provided, and additionally reduction in weight is enabled.

Moreover, the pneumatic tire of the present invention includes the inner liner. Since the pneumatic tire has superior performance of retaining internal pressure due to including the inner liner, and the performance of retaining internal pressure can be maintained even after subjecting to flexion deformity in use.

Effects of the Invention

As described in the foregoing, the multilayered structure of the present invention is superior in gas barrier properties. In addition, since the multilayered structure of the present invention is superior in ductility and has high flex resistance, characteristics such as superior gas barrier properties can be maintained even if used while subjecting to deformation. Therefore, the multilayered structure can be suitably used as an inner liner for pneumatic tires and the like, and the pneumatic tire provided with the inner liner can exhibit a superior internal pressure-retaining performance.

BRIEF DESCRIPTION OF THE DRAWINGS

FIG. 1 shows a partial cross sectional view illustrating one embodiment of a pneumatic tire of the present invention.

DESCRIPTION OF EMBODIMENTS

Hereinafter, embodiments of the present invention will be described in detail regarding in the order of a multilayered structure, an inner liner and a pneumatic tire.
<Multilayered Structure>

The multilayered structure of the present invention has a layer A constituted with a resin composition containing a gas barrier resin, and a layer B being adjacent to the layer A and is constituted with a resin composition containing an elastomer, in which the total number of the layer A and the layer B is at least 7. Moreover, in the multilayered structure, the average thickness of the layer A in terms of a single layer is no less than 0.001 μm and no greater than 10 μm, whereas the average thickness of the layer B in terms of a single layer is no less than 0.001 μm and no greater than 40 μm, and the multilayered structure is formed by irradiating with an active energy ray. It is to be noted that these resin compositions preferably contain additives such as a metal salt and a radical cross-linking agent.

With respect to the multilayered structure, the layer structure, the layer A, the layer B, an additive to the resin composition, a relationship between the layer A and the layer B, and a production method will be explained in this order below.
<Layer Structure>

The multilayered structure has at least 7 layers in total of the layer A and the layer B. Due to the structure in which the layer A and the layer B are thus laminated in a total number of at least 7, continuous development of defects such as pinholes and cracks can be inhibited, and as a result, fracture of the entire layers of the multilayered structure can be prevented, and characteristics such as high gas barrier properties and flex resistance can be provided.

In these regards, and in light of aspects of manufacture, the total number of the layer A and the layer B is preferably at least 17, more preferably at least 25, still more preferably at least, and particularly preferably at least 65. The multilayered structure may be a structural body having multiple layers, and the total number of the layer A and the layer B may be at least 128, at least 256, at least 512, or at least 1,024. It is to be noted that the upper limit of the total number of the layers is appropriately determined in accordance with the intended use of the multilayered structure.

The multilayered structure of the present invention may further have a layer C and the like in addition to the layer A and the layer B. For example, the order of lamination of the layer A and the layer B such as:

(1) A, B, A, B . . . A, B (i.e., $(AB)_n$);
(2) A, B, A, B . . . A (i.e., $(AB)_nA$);
(3) B, A, B, A . . . B (i.e., $(BA)_nB$); and
(4) A, A, B, B . . . B, B (i.e., $(AABB)_n$)

may be employed. In addition, when the other layer C is included, for example, the order of lamination such as (5) A, B, C . . . A, B, C (i.e., $(ABC)_n$)

may be employed.

In particular, with respect to the order of lamination of the layer A and layer B, the layer A and the layer B are preferably laminated alternately as in the above (1), (2) or (3). By irradiating the laminate including the layer A and the layer B alternately laminated in this manner, with an active energy ray, binding properties between each of the laminated layers are enhanced, whereby high adhesiveness can be attained. As a result, inter layer adhesiveness of the multilayered structure, and in turn, gas barrier properties, flex resistance and the like can be significantly improved. In addition, by alternately laminating the layer A and the layer B, the layer A is sandwiched by the layer B from both sides; therefore, ductility of the layer A is further improved.

Furthermore, in the multilayered structure of the present invention, a supporting layer may be also laminated on both sides or one side of such a laminate that includes the layer A, the layer B and the other layer C, etc. The supporting layer is not particularly limited, and for example, a general synthetic resin layer, synthetic resin film or the like may be employed.

In the multilayered structure of the present invention, average thicknesses of the layer A and the layer B in terms of a single layer are no less than 0.001 μm and no greater than 10 μm, and no less than 0.001 μm and no greater than 40 μm, respectively. When the average thicknesses of the layer A and the layer B in terms of a single layer fall within the above range, the number of layers can be increased even if the total thickness of the multilayered structure is the same, and as a result, gas barrier properties, flex resistance and the like of the multilayered structure can be further improved.

It is to be noted that since the layer A which is constituted with a resin composition containing a gas barrier resin and has a thickness falling within the above range, and the layer B constituted with a resin composition containing an elastomer are laminated in the multilayered structure, ductility of the layer A constituted with a resin composition having low ductility can be improved even if ductility of the gas barrier resin per se is low. This advantage is believed to result from lamination of the thin layer A constituted with the resin composition having low ductility on the layer B having high ductility, leading to transition of the state of the resin composition from low ductility to high ductility. The present invention was made focusing on this respect, in which significantly decreasing the thickness of each layer enables both gas barrier properties and flex resistance desired for inner liners for tires and the like to be highly attained although the layer A is constituted with a material having low ductility in general. Therefore, the multilayered structure can maintain characteristics such as high gas barrier properties even in the case of use with deformation by flexion or the like.

The lower limit of the average thickness of the layer A in terms of a single layer is 0.001 μm, preferably 0.005 μm, and more preferably 0.01 μm. On the other hand, the upper limit of the average thickness of the layer A in terms of a single layer is 10 μm, preferably 7 μm, more preferably 5 μm, still more preferably 3 μm, even more preferably 1 μm, yet more preferably 0.5 μm, further preferably 0.2 μm, particularly preferably 0.1 μm, and most preferably 0.05 μm.

When the average thickness of the layer A in terms of a single layer is less than the lower limit described above, formation with a uniform thickness becomes difficult, whereby the gas barrier properties and flex resistance of the multilayered structure may deteriorate. To the contrary, when the average thickness of the resin layer in terms of a single layer is beyond the upper limit described above, durability and crack resistance of the multilayered structure may be deteriorated. In addition, when the average thickness of the layer A in terms of a single layer is beyond the upper limit, improvement of ductility of the layer A as described above may not be sufficiently achieved. It is to be noted that the average thickness of the layer A in terms of a single layer refers to a value derived by dividing the total of the thicknesses of all the layers A included in the multilayered structure, by the number of the layer A.

Although the lower limit of the average thickness of the layer B in terms of a single layer is 0.001 µm, for similar reasons to those of the layer A, the lower limit of the average thickness of the layer B in terms of a single layer is preferably 0.005 µm, and more preferably 0.01 µm. On the other hand, the upper limit of the average thickness of the layer B in terms of a single layer is 40 µm, preferably 30 µm, and more preferably no greater than 20 µm. In the case in which the thickness of the entirety of the multilayered structure is identical, the average thickness of the layer B in terms of a single layer being greater than the upper limit described above may result in deterioration of the durability and crack resistance of the multilayered structure. It is to be noted that the average thickness of the layer B in terms of a single layer also means a value derived by dividing the total of the thickness of all the layers B included in the multilayered structure, by the number of layers B.

It is to be noted that with respect to the average thickness of the layer B in terms of a single layer, a ratio of the average thickness of the layer B in terms of a single layer to the average thickness of the layer A in terms of a single layer (layer B/layer A) is preferably no less than ⅓, and more preferably no less than ½. Furthermore, the ratio is more preferably no less than 1, i.e., the average thickness of the layer B in terms of a single layer being the same as or greater than the average thickness of the layer A in terms of a single layer is more preferred, and the ratio is particularly preferably no less than 2. When the ratio of the thickness in connection with the layer A and the layer B falls within such a range, flexural fatigue properties are improved until leading to fracture of all the layer of the multilayered structure.

The thickness of the multilayered structure is preferably no less than 0.1 µm and no greater than 1,000 µm, more preferably no less than 0.5 µm and no greater than 750 µm, and still more preferably no less than 1 µm and no greater than 500 µm. When the thickness of the multilayered structure falls within the above range, along with the aforementioned average thicknesses of the layer A and the layer B in terms of a single layer falling within the above range, gas barrier properties, flex resistance, crack resistance, durability, stretchability and the like can be further improved, while maintaining applicability to inner liners of pneumatic tires and the like. Note that the thickness of the multilayered structure may be determined by measuring the thickness of the cross section at arbitrarily selected points of the multilayered structure.

<Layer A>

The layer A is constituted with a resin composition containing a gas barrier resin. Since the resin composition constituting the layer A contains a gas barrier resin, the multilayered structure that is superior in gas barrier properties can be obtained.

The gas barrier resin has a function of preventing permeation of gas, specifically has an oxygen transmission rate as determined according to a method described in JIS-K7126 (isopiestic method) under conditions including 20° C. and 65% RH of no greater than 100 mL·20 µm/(m²·day·atm). It should be noted that the oxygen transmission rate of the gas barrier resin used in the present invention is preferably no greater than 50 mL·20 µm/(m²·day·atm), and more preferably no greater than 10 mL·20 µm/(m²·day·atm).

Such a gas barrier resin is exemplified by EVOH, a polyamide resin, a polyester resin, polyvinylidene chloride, an acrylonitrile copolymer, polyvinylidene fluoride, polychlorotrifluoroethylene, polyvinyl alcohol, and the like.

Of these resins having gas barrier properties, EVOH, polyamide resins and polyester resins are preferred in light of the gas barrier properties, and EVOH is particularly preferred in light of not only gas barrier properties but also melt formability, adhesiveness with the layer B, and the like.

<Polyamide Resin>

The polyamide resin is a polymer having an amide bond, and can be obtained by ring-opening polymerization of lactam, polycondensation of aminocarboxylic acid or diamine with dicarboxylic acid, or the like.

Examples of the lactam include ε-caprolactam, ω-laurolactam, and the like.

Examples of the aminocarboxylic acid include 6-aminocaproic acid, 11-aminoundecanoic acid, 12-aminododecanoic acid, paraminomethylbenzoic acid, and the like.

Examples of the diamine include tetramethylenediamine, hexamethylenediamine, undecamethylenediamine, dodecamethylenediamine, 2,2,4-trimethylhexamethylenediamine, 2,4,4-trimethylhexamethylenediamine, 5-methylnonamethylenediamine, m-xylylenediamine, p-xylylenediamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, aminoethylpiperazine, and the like.

The dicarboxylic acid is exemplified by succinic acid, glutaric acid, adipic acid, pimelic acid, suberic acid, azelaic acid, sebacic acid, dodecanedicarboxylic acid, cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)-2,4,8,10-tetraoxaspiro[5.5]undecane, trimellitic acid, trimesic acid, pyromellitic acid, tricarballylic acid, terephthalic acid, isophthalic acid, phthalic acid, 2-methylterephthalic acid, naphthalenedicarboxylic acid, biphenyldicarboxylic acid, tetralindicarboxylic acid, and the like.

Exemplary methods for the polycondensation which may be employed in synthesizing the polyamide resin include a method in which polycondensation is allowed in a molten state, and a method in which polycondensation is once allowed in a molten state to obtain low viscosity polyamide, followed by subjecting to a heat treatment in a solid phase state (solid phase polymerization, generally referred to). Exemplary methods for the polycondensation in a molten state which may be employed include a method in which an aqueous solution of a nylon salt of diamine and dicarboxylic acid is heated under pressure, and then polycondensation is allowed in a molten state while eliminating water and condensed water, a method in which diamine is directly added to dicarboxylic acid in a molten state, and then polycondensation is allowed under normal pressure, and the like.

Examples of specific polyamide resin that is a polycondensate of the compound or the like include aliphatic polyamide resins such as polycaprolactam (nylon 6), polylaurolactam (nylon 12), polyhexamethylenediadipamide (nylon 66), polyhexamethyleneazelamide (nylon 69), polyhexamethylenesebacamide (nylon 610), nylon 46, nylon 6/66, nylon 6/12, and a condensation product of 11-aminoundecanoic acid (nylon 11), aromatic polyamide resins such as polyhexamethyleneisophthalamide (nylon 6IP), m-xylenediamine/adipic acid copolymer (nylon MXD6), and m-xylenediamine/adipic acid/isophthalic acid copolymer, and the like. These may be used alone or as a mixture of two or more thereof.

Among these polyamide resins, nylon MXD6 having superior gas barrier properties is preferred. With respect to a diamine component of the nylon MXD6, m-xylylenediamine is preferably included in an amount of no less than 70 mol %. Whereas, with respect to a dicarboxylic acid component, adipic acid is preferably included in an amount of no less than 70 mol %. When nylon MXD6 is obtained from the monomer blended as described above, more superior gas barrier properties and mechanical performances can be achieved.

<Polyester Resin>

The polyester resin is a polymer having an ester bond, and can be obtained by polycondensation of polyvalent carboxylic acid with polyol, and the like. Examples of the polyester resin which may be used as a resin having gas barrier properties of the multilayered structure include polyethylene terephthalate (PET), polyethylene naphthalate (PEN), polyglycolic acid (PGA), aromatic liquid crystal polyesters, and the like. These may be used alone or as a mixture of two or more thereof. Among these polyester resins, PGA and wholly aromatic liquid crystal polyesters are preferred in light of the extent of gas barrier properties.

<PGA>

PGA is a homopolymer or copolymer having a structural unit (GA) represented by $-O-CH_2-CO-$. The content of the aforementioned structural unit (GA) in PGA is preferably no less than 60% by mass, more preferably no less than 70% by mass, and still more preferably no less than 80% by mass. Also, the upper limit of the content is preferably 100% by mass. When the content of the structural unit (GA) is less than the lower limit described above, gas barrier properties may not be sufficiently achieved.

Exemplary methods for producing PGA include (1) a method of synthesis by way of dehydrative polycondensation of glycolic acid, (2) a method of synthesis by way of dealcoholizing polycondensation of a glycolic acid alkyl ester, (3) a method of synthesis by way of ring-opening polymerization of glycolide (1,4-dioxane-2,5-dione), and the like.

Exemplary methods for synthesizing PGA as a copolymer may include methods in which copolymerization is carried out in each synthesis method described above using as a comonomer, for example, a cyclic monomer such as ethylene oxalate (1,4-dioxane-2,3-dione), lactide, lactones (for example, β-propiolactone, β-butyrolactone, pivalolactone, γ-butyrolactone, δ-valerolactone, β-methyl-δ-valerolactone, ε-caprolactone, etc.), trimethylene carbonate or 1,3-dioxane;

hydroxycarboxylic acid such as lactic acid, 3-hydroxypropanoic acid, 3-hydroxybutanoic acid, 4-hydroxybutanoic acid or 6-hydroxycaproic acid, or an alkyl ester thereof;

a mixture of aliphatic diol such as ethylene glycol or 1,4-butanediol with substantially equimolar aliphatic dicarboxylic acid such as succinic acid or adipic acid, or an alkyl ester thereof; or the like, in appropriate combination with glycolide, glycolic acid or a glycolic acid alkyl ester.

In a specific method of the ring-opening polymerization described above in section (3), glycolide is heated to a temperature of about 120° C. to about 250° C. in the presence of a small amount of a catalyst (for example, a cationic catalyst such as organic tin carboxylate, tin halide or antimony halide). The ring-opening polymerization is carried out preferably by a block polymerization process or solution polymerization process.

In the ring-opening polymerization, glycolide used as a monomer may be obtained by a sublimation depolymerization process, solution-phase depolymerization process, or the like of a glycolic acid oligomer.

A typical solution-phase depolymerization process includes, for example, (1) heating a mixture containing a glycolic acid oligomer and at least one high-boiling point polar organic solvent having a boiling point within the range of 230 to 450° C., under an normal pressure or a reduced pressure at a temperature at which depolymerization of the oligomer occurs, (2) dissolving the oligomer in a solvent until a residual ratio (volume ratio) of the melt phase of the oligomer becomes no greater than 0.5, (3) allowing the oligomer to be depolymerized by further heating at the same temperature, (4) distilled off the produced dimer cyclic ester (glycolide) together with the high-boiling point polar organic solvent, and (5) recovering the glycolide from the distillate.

Examples of the high-boiling point polar organic solvent include phthalic acid bis(alkoxyalkyl ester) such as di(2-methoxyethyl)phthalate, alkylene glycol dibenzoate such as diethylene glycol dibenzoate, aromatic carboxylate esters such as benzylbutyl phthalate and dibutyl phthalate, aromatic phosphoric acid esters such as tricresyl phosphate, and the like. Also, together with the high-boiling point polar organic solvent, polypropylene glycol, polyethylene glycol, tetraethylene glycol or the like may be used in combination as a solubilizing agent of the oligomer if necessary.

<Wholly Aromatic Liquid Crystal Polyester>

The wholly aromatic liquid crystal polyester is a liquid crystalline polyester in which polyvalent carboxylic acid and polyol provided as monomers are both an aromatic compound. The wholly aromatic liquid crystal polyester may be obtained by polymerization according to a well-known method similar to general polyesters.

The aromatic polyvalent carboxylic acid is exemplified by terephthalic acid, isophthalic acid, 2,6-naphthalenedicarboxylic acid, 2,7-naphthalenedicarboxylic acid, 1,4-naphthalenedicarboxylic acid, 4,4'-biphenyldicarboxylic acid, 3,3'-biphenyldicarboxylic acid, 4,4'-methylenedibenzoic acid, diphenic acid and the like. These may be used alone or as a mixture of two or more thereof.

The aromatic polyol is exemplified by hydroquinone, methylhydroquinone, 4,4'-dihydroxydiphenyl, resorcinol, phenylhydroquinone, 3,4'-bisphenol A, and the like. These may be used alone or as a mixture of two or more thereof.

Moreover, the wholly aromatic liquid crystal polyester may be obtained also by polymerization of an aromatic compound that has a hydroxy group and a carboxyl group such as hydroxybenzoic acid or hydroxynaphthoic acid, etc., or copolymerization with the aromatic polyvalent carboxylic acid and aromatic polyol.

<EVOH>

Hereinafter, EVOH suitably used as a gas barrier resin of the multilayered structure of the present invention is explained in detail.

The EVOH has an ethylene unit and a vinyl alcohol unit as principal structural units, and is usually obtained by polymerizing ethylene with vinyl ester, and saponifying the resultant ethylene-vinyl ester copolymer.

The lower limit of the content of ethylene units in the EVOH (i.e., the proportion of the number of ethylene units with respect to the total number of monomer units in the EVOH) is preferably 3 mol %, more preferably 10 mol %, still more preferably 20 mol %, and particularly preferably 25 mol %. On the other hand, the upper limit of the content of ethylene units in the EVOH is preferably 70 mol %, more preferably 60 mol %, still more preferably 55 mol %, and particularly preferably 50 mol %.

When the ethylene unit content falls within the range of 3 to 70 mol %, gas barrier properties of the multilayered structure are improved, and additionally melt formability can be improved, thereby enabling the inter layer adhesiveness to be improved owing to the superior melt formability. When the content of ethylene units in the EVOH is less than the lower limit described above, water resistance, hot water resistance, and gas barrier properties under highly humid conditions of the multilayered structure may be deteriorated, or melt formability of the multilayered structure may be impaired. To the contrary, when the content of ethylene units in the EVOH is beyond the upper limit described above, the gas barrier properties of the multilayered structure may be deteriorated.

The lower limit of the degree of saponification of the EVOH (i.e., a proportion of the number of vinyl alcohol units with respect to the total number of vinyl alcohol units and vinyl ester units in the EVOH) is preferably 80 mol %, more preferably 95 mol % and particularly preferably 99 mol %. When the degree of saponification of the EVOH is no less than 80 mol %, gas barrier properties of the multilayered structure can be further improved and the moisture resistance can be also improved, and additionally improvement of inter layer adhesiveness with an elastomer layer is enabled. When the degree of saponification of the EVOH is less than the lower limit, melt formability may be deteriorated, and further the gas barrier property of the multilayered structure may be impaired and coloring resistance and moisture resistance may be unsatisfactory.

On the other hand, the upper limit of the degree of saponification of the EVOH is preferably 99.99 mol %. When the degree of saponification of the EVOH is beyond the upper limit, improvement of the gas barrier properties and the like with respect to an increase in production costs of the EVOH can be expected to an unsatisfactory extent. It is to be noted that the EVOH may be used alone, or as a mixture of a plurality of the EVOHs having each distinct degree of saponification.

It is preferred that the content G (mol %) of the 1,2-glycol bond structural units in the EVOH satisfies the following formula (1), and that the intrinsic viscosity is no less than 0.05 L/g and no greater than 0.2 L/g. In the following formula (I), E represents the content of ethylene units (mol %) in the EVOH (wherein, E≤64 (mol %)).

$$G \leq 1.58 - 0.0244 \times E \quad (1)$$

When the resin composition in the layer A includes EVOH having such a content G of 1,2-glycol bond structural units and an intrinsic viscosity, a feature of decreasing humidity dependency of gas barrier properties of the resulting multilayered structure can be exhibited, and favorable transparency and gloss are provided, while lamination with other thermoplastic resin can be facilitated. It is to be noted that the content G of the 1,2-glycol bond structural units may be determined in accordance with the method described by S. Aniya et al., (Analytical Science Vol. 1, 91 (1985)), by way of a nuclear magnetic resonance process at a temperature of 90° C. with a dimethyl sulfoxide solution as an EVOH sample.

The EVOH preferably has at least one selected from the group consisting of the structural units (I) and (II). The lower limit of the content of at least one selected from the structural units (I) and (II) with respect to the entire structural units is preferably 0.5 mol %, more preferably 1 mol %, and still more preferably 1.5 mol %. On the other hand, the upper limit of the content of at least one selected from the structural units (I) and (II) is preferably 30 mol %, more preferably 15 mol %, and still more preferably 10 mol %. When the resin composition in the layer A has the structural unit (I) and/or structural unit (II) at a proportion falling within the above range, flexibility and processing characteristics of the resin composition constituting the layer A are improved, and consequently, the stretchability and thermoformability of the multilayered structure can be improved.

In the structural units (I) and (II), the aliphatic hydrocarbon group having 1 to 10 carbon atoms is exemplified by an alkyl group, an alkenyl group and the like, the alicyclic hydrocarbon group having 3 to 10 carbon atoms is exemplified by a cycloalkyl group, a cycloalkenyl group and the like, and the aromatic hydrocarbon group having 6 to 10 carbon atoms is exemplified by a phenyl group, and the like.

In the structural unit (I), it is preferred that the $R^1$, $R^2$ and $R^3$ each independently represent a hydrogen atom, a methyl group, an ethyl group, a hydroxyl group, a hydroxymethyl group or a hydroxyethyl group. Among these, it is more preferred that they each independently represent a hydrogen atom, a methyl group, a hydroxyl group or a hydroxymethyl group. When the $R^1$, $R^2$ and $R^3$ each represent these options, stretchability and thermoformability of the multilayered structure can be further improved.

Although the method for allowing the EVOH to include the structural unit (I) is not particularly limited, for example, a method in which a monomer derived into the structural unit (I) is copolymerized in polymerization of the ethylene and vinyl ester may be involved. The monomer derived into the structural unit (I) is exemplified by alkenes such as propylene, butylene, pentene and hexene; alkenes having a hydroxyl group and/or an ester group such as 3-hydroxy-1-propene, 3-acyloxy-1-propene, 3-acyloxy-1-butene, 4-acyloxy-1-butene, 3,4-diacyloxy-1-butene, 3-acyloxy-4-hydroxy-1-butene, 4-acyloxy-3-hydroxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-hydroxy-1-pentene, 5-hydroxy-1-pentene, 4,5-dihydroxy-1-pentene, 4-acyloxy-1-pentene, 5-acyloxy-1-pentene, 4,5-diacyloxy-1-pentene, 4-hydroxy-3-methyl-1-pentene, 5-hydroxy-3-methyl-1-pentene, 4,5-dihydroxy-3-methyl-1-pentene, 5,6-dihydroxy-1-hexene, 4-hydroxy-1-hexene, 5-hydroxy-1-hexene, 6-hydroxy-1-hexene, 4-acyloxy-1-hexene, 5-acyloxy-1-hexene, 6-acyloxy-1-hexene and 5,6-diacyloxy-1-hexene. Of these, in light of reactivity for copolymerization, and gas barrier properties of the resulting multilayered structure, propylene, 3-acyloxy-1-propene, 3-acyloxy-1-butene, 4-acyloxy-1-butene, and 3,4-diacetoxy-1-butene are preferred. Specifically, among these, propylene, 3-acetoxy-1-propene, 3-acetoxy-1-butene, 4-acetoxy-1-butene and 3,4-diacetoxy-1-butene are preferred, and of these, 3,4-diacetoxy-1-butene is particularly preferred. In the case of the alkene having an ester, it is derived into the structural unit (I) during the saponification reaction.

In the above structural unit (II), it is preferred that $R^4$ and $R^5$ both represent a hydrogen atom. Particularly, it is more preferred that $R^4$ and $R^5$ both represent a hydrogen atom, one of the $R^6$ and $R^7$ represents an aliphatic hydrocarbon group having 1 to 10 carbon atoms, and the rest represents a hydrogen atom. The aliphatic hydrocarbon group is preferably an alkyl group or an alkenyl group. In light of particular note taken for the gas barrier properties of the multilayered structure, it is particularly preferred that one of the $R^6$ and $R^7$ represents a methyl group or an ethyl group, and the rest represents a hydrogen atom. Alternatively, it is also particularly preferred that one of the $R^6$ and $R^7$ represents a substituent represented by $(CH_2)_hOH$ (wherein, h is an integer of 1 to 8), whereas the rest represents a hydrogen atom. In the substituent represented by $(CH_2)_hOH$, h is preferably an integer of 1 to 4, more preferably 1 or 2, and particularly preferably 1.

Although the method for allowing EVOH to include the structural unit (II) is not particularly limited, for example, a method in which EVOH obtained by a saponification reaction is allowed to react with a monovalent epoxy compound to permit the EVOH to include the structural unit (II) may be employed. As the monovalent epoxy compound, a compound represented by any of the following formulae (III) to (IX) is suitably used.

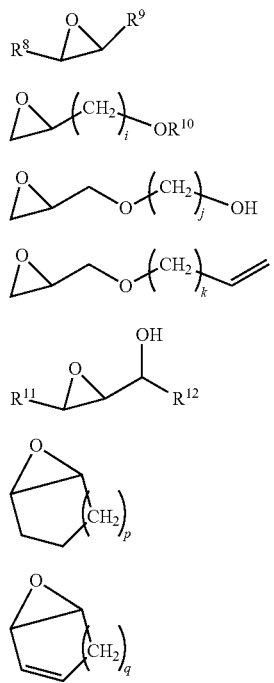

In the above formulae (III) to (IX), $R^8$, $R^9$, $R^{10}$, $R^{11}$ and $R^{12}$ each independently represent a hydrogen atom, an aliphatic hydrocarbon group having 1 to 10 carbon atoms such as an alkyl group or an alkenyl group, an alicyclic hydrocarbon group having 3 to 10 carbon atoms such as a cycloalkyl group or a cycloalkenyl group, or an aromatic hydrocarbon group having 6 to 10 carbon atoms such as a phenyl group; and i, j, k, p and q represent an integer of 1 to 8.

Examples of the monovalent epoxy compound represented by the above formula (III) include epoxyethane (ethylene oxide), epoxypropane, 1,2-epoxybutane, 2,3-epoxybutane, 3-methyl-1,2-epoxybutane, 1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 3-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1, 2-epoxyheptane, 4-methyl-1,2-epoxyhexane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-ethyl-1,2-epoxyheptane, 4-propyl-1,2-epoxyheptane, 6-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 5-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 4,5-epoxyundecane, 5,6-epoxyundecane, 1,2-epoxidedecane, 2,3-epoxidedecane, 3,4-epoxidedecane, 4,5-epoxidedecane, 5,6-epoxidedecane, 6,7-epoxidedecane, epoxyethylbenzene, 1-phenyl-1,2-propane, 3-phenyl-1,2-epoxypropane, 1-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, and the like.

Examples of the monovalent epoxy compound represented by the above formula (IV) include methylglycidyl ether, ethylglycidyl ether, n-propylglycidylether, isopropyl glycidyl ether, n-butylglycidylether, isobutyl glycidyl ether, tert-butylglycidyl ether, 1,2-epoxy-3-pentyloxypropane, 1,2-epoxy-3-hexyloxypropane, 1,2-epoxy-3-heptyloxypropane, 1,2-epoxy-4-phenoxybutane, 1,2-epoxy-4-benzyloxybutane, 1,2-epoxy-5-methoxypentane, 1,2-epoxy-5-ethoxypentane, 1,2-epoxy-5-propoxypentane, 1,2-epoxy-5-butoxypentane, 1,2-epoxy-5-pentyloxypentane, 1,2-epoxy-5-hexyloxypentane, 1,2-epoxy-5-phenoxypentane, 1,2-epoxy-6-methoxyhexane, 1,2-epoxy-6-ethoxyhexane, 1,2-epoxy-6-propoxyhexane, 1,2-epoxy-6-butoxyhexane, 1,2-epoxy-6-heptyloxyhexane, 1,2-epoxy-7-methoxyheptane, 1,2-epoxy-7-ethoxyheptane, 1,2-epoxy-7-propoxyheptane, 1,2-epoxy-7-butoxyheptane, 1,2-epoxy-8-methoxyoctane, 1,2-epoxy-8-ethoxyoctane, 1,2-epoxy-8-butoxyoctane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, and the like.

Examples of the monovalent epoxy compound represented by the above formula (V) include ethylene glycol monoglycidyl ether, propanediol monoglycidyl ether, butanediol monoglycidyl ether, pentanediol monoglycidyl ether, hexanediol monoglycidyl ether, heptanediol monoglycidyl ether, octanediol monoglycidyl ether, and the like.

Examples of the monovalent epoxy compound represented by the above formula (VI) include 3-(2,3-epoxy)propoxy-1-propene, 4-(2,3-epoxy)propoxy-1-butene, 5-(2, 3-epoxy)propoxy-1-pentene, 6-(2,3-epoxy)propoxy-1-hexene, 7-(2,3-epoxy)propoxy-1-heptene, 8-(2,3-epoxy)propoxy-1-octene, and the like.

Examples of the monovalent epoxy compound represented by the above formula (VII) include 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4,4-dimethyl-1-hexanol, 2,3-epoxy-4,4-diethyl-1-hexanol, 2,3-epoxy-4-methyl-4-ethyl-1-hexanol, 3,4-epoxy-5-methyl-2-hexanol, 3,4-epoxy-5,5-dimethyl-2-hexanol, 3,4-epoxy-2-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-2-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-4-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, and the like.

Examples of the monovalent epoxy compound represented by the above formula (VIII) include 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, and the like.

Examples of the monovalent epoxy compound represented by the above formula (IX) include 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, and the like.

Among the aforementioned monovalent epoxy compounds, epoxy compounds having 2 to 8 carbon atoms are preferred. Particularly, in light of easy handling of the compound, and reactivity with EVOH, the monovalent epoxy compound has carbon atoms of more preferably 2 to 6, and still more preferably 2 to 4. Also, among the monovalent epoxy compounds represented by the above formula, compounds represented by the formula (III) or (IV) are particularly preferred. Specifically, in light of reactivity with EVOH and gas barrier properties of the resultant multilayered structure, 1,2-epoxybutane, 2,3-epoxybutane, epoxypropane, epoxyethane and glycidol are preferred, and of these, epoxypropane and glycidol are particularly preferred.

Next, a method for producing EVOH is explained in detail. A method for copolymerization of ethylene and a vinyl ester is not particularly limited, and for example, any one of solution polymerization, suspension polymerization, emulsion polymerization, bulk polymerization may be employed. Further, either continuous, or batch-wise system may be adopted.

The vinyl ester which may be used for the polymerization is a fatty acid vinyl ester such as vinyl acetate, vinyl propionate or vinyl pivalate.

In the polymerization, further to the aforementioned components, a copolymerizable monomer, for example, other than those described in the foregoing, an alkene; an unsaturated acid such as acrylic acid, methacrylic acid, crotonic acid, maleic acid or itaconic acid, or an anhydride, salt, or mono or dialkyl ester thereof; a nitrile such as acrylonitrile or methacrylonitrile; an amide such as acrylamide or methacryl amide; an olefin sulfonic acid such as vinylsulfonic acid, allyl sulfonic acid or methallyl sulfonic acid, or a salt thereof; an alkylvinyl ether, vinylketone, N-vinylpyrrolidone, vinyl chloride, vinylidene chloride or the like may be copolymerized as a copolymerization component in a small amount.

In addition, as a copolymerization component, a vinylsilane compound may be included in an amount of no less than 0.0002 mol % and no greater than 0.2 mol %. Examples of the vinylsilane compound include vinyltrimethoxysilane, vinyltriethoxysilane, vinyltri($\beta$-methoxy-ethoxy)silane, $\gamma$-methacryloyloxypropylmethoxysilane, and the like. Of these, vinyltrimethoxysilane or vinyltriethoxysilane may be suitably used.

The solvent which may be used for the polymerization is not particularly limited as long as it is an organic solvent which can dissolve ethylene, vinyl ester and the ethylene-vinyl ester copolymer. As such a solvent, for example, alcohol such as methanol, ethanol, propanol, n-butanol or tert-butanol; dimethyl sulfoxide, or the like may be used. Of these, methanol is particularly preferred in terms of ease in separation and removal after the reaction.

As the catalyst for use in the polymerization, for example, an azonitrile based initiator such as 2,2'-azobisisobutyronitrile, 2,2'-azobis-(2,4-dimethylvaleronitrile), 2,2'-azobis-(4-methoxy-2,4-dimethylvaleronitrile) or 2,2'-azobis-(2-cyclopropylpropionitrile); an organic peroxide based initiator such as isobutyryl peroxide, cumyl peroxyneodecanoate, diisopropyl peroxycarbonate, di-n-propyl peroxydicarbonate, t-butyl peroxyneodecanoate, lauroyl peroxide, benzoyl peroxide or t-butyl hydroperoxide, or the like may be used.

The polymerization temperature is about 20 to 90° C., and preferably 40 to 70° C. The polymerization time is about 2 to 15 hours, and preferably 3 to 11 hours. The degree of polymerization is about 10 to 90%, and preferably 30 to 80% with respect to the vinyl ester charged. The resin content in the solution after the polymerization is about 5 to 85% by mass, and preferably 20 to 70% by mass.

After the polymerization for a predetermined period of time or after reaching to a predetermined degree of polymerization, a polymerization inhibitor is added as needed, and unreacted ethylene gas is eliminated by evaporation, followed by removal of unreacted vinyl ester. In an exemplary method which may be employed for removing unreacted vinyl ester, for example, the copolymer solution is continuously supplied at a constant speed from above a tower packed with Raschig rings, while steam of an organic solvent such as methanol is blown into the bottom of the tower, a mixed steam of the organic solvent such as methanol and the unreacted vinyl ester is distilled off from the top of the tower, whereas the copolymer solution from which the unreacted vinyl ester was eliminated is recovered from the bottom of the tower.

Next, an alkali catalyst is added to the copolymer solution, and the copolymer is saponified. The saponification method may be executed by either a continuous or batchwise system. Examples of the alkali catalyst which may be used include sodium hydroxide, potassium hydroxide, alkali metal alcoholate, and the like.

Conditions of saponification involve, for example in the case of a batchwise system, the copolymer solution concentration of about 10 to 50% by mass, the reaction temperature of about 30 to 65° C., the catalyst amount used of about 0.02 to 1.0 mol per mol of the vinyl ester structural unit, and the saponification time of about 1 to 6 hours.

Since EVOH yielded after completing the saponification reaction contains the alkali catalyst, by-product salts such as sodium acetate and potassium acetate, and other impurities, these are preferably eliminated by neutralizing and washing as needed. In this process, when (modified) EVOH after completing the saponification reaction is washed with water such as ion exchanged water, which is almost free from metal ions, chloride ions and the like, a part of sodium acetate, potassium acetate and the like may remain.

<Additives in the Resin Composition for Forming the Layer A>

The resin composition for forming the layer A may contain additive(s) such as one or a plurality of types of compounds selected from a phosphate compound, a carboxylic acid and a boron compound depending on the mode for carrying out the invention. When such a phosphate compound, a carboxylic acid or a boron compound is contained in the resin composition in the layer A, various types of performance of the multilayered structure can be improved.

Specifically, when a phosphate compound is contained in the resin composition in the layer A containing EVOH, etc., thermal stability of the multilayered structure during melt forming can be improved. The phosphate compound is not particularly limited, and is exemplified by various types of acids such as phosphoric acid and phosphorous acid, and salts thereof, and the like. The phosphoric acid salt may be included in any form such as, for example, a phosphate salt, a monohydrogen phosphate salt or a dihydrogen phosphate salt, and its counter cation species is not particularly limited, which is preferably an alkali metal ion or an alkaline earth metal ion. Particularly, sodium dihydrogenphosphate, potassium dihydrogenphosphate, sodium hydrogenphosphate or potassium hydrogenphosphate is preferred in light of excellent effects of improving thermal stability.

The lower limit of the content of the phosphate compound (the content of the phosphate compound in terms of the phosphoric radical equivalent in the dry resin composition in the layer A) is preferably 1 ppm by mass, more preferably 10 ppm by mass, and still more preferably 30 ppm by mass. On the other hand, the upper limit of the content of the phosphate compound is preferably 10,000 ppm by mass, more preferably 1,000 ppm by mass, and still more preferably 300 ppm by mass. When the content of the phosphate compound is less than the lower limit described above, coloring during melt forming tends to be significant. Since this tendency is remarkable when heat history is repeated in particular, a product obtained by forming a pellet of the resin composition may lack probability of recovery. To the contrary, when the content of the phosphate compound is beyond the upper limit described above, the gel or degraded materials may be easily generated during forming.

In addition, the carboxylic acid included in the resin composition in the layer A containing EVOH, etc., is effective in controlling the pH of the resin composition, and preventing gelation to improve the thermal stability. The carboxylic acid is preferably acetic acid or lactic acid in light of costs and the like.

The lower limit of the content of the carboxylic acid (the content of the carboxylic acid in the dry resin composition in the layer A) is preferably 1 ppm by mass, more preferably 10 ppm by mass, and still more preferably 50 ppm by mass. On the other hand, the upper limit of the content of the carboxylic acid is preferably 10,000 ppm by mass, more preferably 1,000 ppm by mass, and still more preferably 500 ppm by mass. When the content of the carboxylic acid is less than the lower limit described above, coloring may occur during the melt forming. To the contrary, the content of the carboxylic acid is beyond the upper limit described above, the inter layer adhesiveness may be insufficient.

Furthermore, the boron compound included in the resin composition in the layer A containing EVOH, etc., is effective in improving thermal stability. In detail, when the boron compound is added to the resin composition constituted with EVOH, etc., it is believed that a chelate compound is produced between EVOH, etc., and the boron compound. Thus, use of such EVOH, etc., enables more superior thermal stability to be achieved than common EVOH, etc., and mechanical properties to be improved. The boron compound is not particularly limited, and examples include boric acids, boric acid esters, boric acid salts, hydroborates, and the like. Specifically, boric acids are exemplified by ortho-boric acid ($H_3BO_3$), meta-boric acid, tetraboric acid and the like; boric acid esters are exemplified by triethyl borate, trimethyl borate and the like; boric acid salts are exemplified by alkali metal salts, alkaline earth metal salts and borax of the various types of boric acids described above and the like. Of these, ortho-boric acid is preferred.

The lower limit of the content of the boron compound (the content of the boron compound equivalent to boron in the dry resin composition in the layer A) is preferably 1 ppm by mass, more preferably 10 ppm by mass, and still more preferably 50 ppm by mass. On the other hand, the upper limit of the content of the boron compound is preferably 2,000 ppm by mass, more preferably 1,000 ppm by mass, and still more preferably 500 ppm by mass. When the content of the boron compound is less than the lower limit described above, the effect of improving thermal stability by adding the boron compound may not be achieved. To the contrary, when the content of the boron compound is beyond the upper limit described above, gelation is likely to occur, and forming defectiveness may be caused.

A process for including the phosphate compound, carboxylic acid or boron compound in the resin composition containing EVOH, etc., is not particularly limited, and for example, a process in which the phosphate compound is added to the resin composition when a pellet or the like of resin composition containing EVOH, etc., is prepared, followed by kneading may be suitably employed. A process for adding to the resin composition is not also particularly limited, and illustrative examples include a process of adding in a form of a dry powder, a process of adding in a paste form impregnated with a solvent, a process of adding in a form suspended in a liquid, a process of adding as a solution dissolved in a solvent, and the like. Of these, in light of allowing for homogenous dispersion, a process of adding as a solution dissolved in a solvent is preferred. The solvent used in these methods is not particularly limited, and water is suitably used in light of solubility of additives, advantages in terms of costs, ease in handling, perfectibility of operational environments, and the like. When thus added, a metal salt, a resin other than EVOH, etc., and other additives and the like described later may be concomitantly added.

Moreover, as a process for including the phosphate compound, carboxylic acid, boron compound, a process of immersing a pellet or strand obtained with an extruder or the like after the aforementioned saponification in a solution containing these substances dissolved is also preferred in light of enabling homogenously dispersion. Also in this process, water is suitably used as a solvent for similar reasons to those described above. By dissolving a metal salt described later to this solution, the metal salt and the phosphate compound and the like may be contained together with.

The resin composition in the layer A preferably contains a compound that has a conjugated double bond having a molecular weight of no greater than 1,000. Due to including such a compound, the color characteristics of the resin composition in the layer A is improved; therefore, a multilayered structure having a favorable appearance can be provided. Examples of such a compound include conjugated diene compounds having a structure in which at least two carbon-carbon double bonds and one carbon-carbon single bond are alternately linked, triene compounds having a structure in which three carbon-carbon double bonds and two carbon-carbon single bonds are alternately linked, conjugated polyene compounds having a structure in which more carbon-carbon double bonds and carbon-carbon single bonds are alternately linked, conjugated triene compounds such as 2,4,6-octatriene, and the like. Furthermore, in the compound that has a conjugated double bond, a plurality of conjugated double bonds may be present independently in one molecule, and for example, a compound in which three conjugated trienes are included in the same molecule, such as wood oil, may be also involved.

Examples of the compound that has a conjugated double bond may have, for example, any of other various types of functional groups such as a carboxy group and salts thereof, a hydroxyl group, an ester group, a carbonyl group, an ether group, an amino group, an imino group, an amide group, a cyano group, a diazo group, a nitro group, a sulfone group, a sulfoxide group, a sulfide group, a thiol group, a sulfonic acid group and salts thereof, a phosphoric acid group and salts thereof, a phenyl group, a halogen atom, a double bond, a triple bond, and the like. Such a functional group may be directly bound to a carbon atom in the conjugated double bond, or may be bound to a position away from the conjugated double bond. A multiple bond in the functional group may be present at a position capable of conjugating with the conjugated double bond, and for example, 1-phenylbutadiene having a phenyl group, and sorbic acid having a carboxy group and the like are also included in the compound that has a conjugated double bond as referred to herein. Specific examples of the compound include 2,4-diphenyl-4-methyl-1-pentene, 1,3-diphenyl-1-butene, 2,3-dimethyl-1,3-butadiene, 4-methyl-1,3-pentadiene, 1-phenyl-1,3-butadiene, sorbic acid, myrcene, and the like.

The conjugated double bond in the compound that has a conjugated double bond includes not only a conjugated double bond between aliphatic moieties such as 2,3-dimethyl-1,3-butadiene or sorbic acid, but also a conjugated double bond between aliphatic and aromatic moieties such as 2,4-diphenyl-4-methyl-1-pentene or 1,3-diphenyl-1-butene. Note that in light of possibility to obtain a multilayered structure having more superior appearance, the compound that includes a conjugated double bond between aliphatic moieties is preferred, and a compound that includes a conjugated double bond having a polar group such as a carboxy group or a salt thereof, or a hydroxyl group is also preferred. Moreover, a compound that includes a conjugated double bond between aliphatic moieties and having a polar group is particularly preferred.

The molecular weight of the compound that has a conjugated double bond is preferably no greater than 1,000. When the molecular weight is greater than 1,000, surface smoothness, extrusion stability and the like of the multilayered structure may be deteriorated. The lower limit of the content of the compound that has a conjugated double bond having a molecular weight of no greater than 1,000 is, in light of achievable effects, preferably 0.1 ppm by mass, more preferably 1 ppm by mass, still more preferably 3 ppm by mass, and particularly preferably 5 ppm by mass. On the other hand, the upper limit of the content of the compound is, in light of achievable effects, preferably 3,000 ppm by mass, more preferably 2,000 ppm by mass, still more preferably 1,500 ppm by mass, and particularly preferably 1,000 ppm by mass.

A preferred process of adding the compound that has a conjugated double bond may include polymerizing as described above, followed by adding the compound prior to the saponification described above, in light of the improvement of the surface smoothness and extrusion stability. Although the reason is not necessarily clarified, the compound that has a conjugated double bond is believed to serve in preventing EVOH, etc., from deterioration before the saponification and/or during the saponification reaction.

The resin composition in the layer A may contain in addition to the aforementioned additives, a resin other than the EVOH, etc., as well as various additives such as a heat stabilizer, an ultra violet ray absorbing agent, an antioxidant, a colorant and a filler in the range not to impair the object of the present invention. When the resin composition in the layer A contains such additives other than the additives described above, the amount is preferably no greater than 50% by mass, more preferably no greater than 30% by mass, and particularly preferably no greater than 10% by mass with respect to the total amount of the resin composition.

The resin composition in the layer A preferably has, in connection with a relationship between the melt kneading time and the torque at at least one point of a temperature that is higher than its melting point by 10 to 80° C., a value of viscosity behavioral stability ($M_{100}/M_{20}$, wherein $M_{20}$ represents a torque determined 20 min after starting kneading, and $M_{100}$ represents a torque determined 100 min after starting kneading) falling within the range of 0.5 to 1.5. As the value of the viscosity behavioral stability is approximate to 1, superior thermal stability (long run property) is indicated, with less change in the viscosity.

<B Layer>

The layer B is constituted with a resin composition containing an elastomer. When the resin composition constituting the layer B contains an elastomer, ductility of the multilayered structure is improved, and thus flex resistance can be improved. Furthermore, lamination of the layer B constituted with a resin composition containing an elastomer together with the layer A having a specified thickness enables the ductility of the layer A to be increased even if the resin composition in the layer A has low ductility.

Elastomers are resins having elasticity at around normal temperatures, and more specifically, resins having the following feature: when a sample is stretched two-fold under a room temperature condition (20° C.) and maintained as is for 1 min, the sample contracts to a length of less than 1.5-fold of the initial length within 1 min. In addition, elastomers are generally, in terms of their structures, polymers having a hard segment and a soft segment in the polymer chain.

As the elastomer, at least one selected from the group consisting of a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer and a fluorocarbon resin based elastomer may be exemplified. Of these, in light of ease of forming, at least one selected from the group consisting of a polystyrene based elastomer, a polyolefin based elastomer, a polydiene based elastomer, a polyurethane based elastomer, a polyester based elastomer and a polyamide based elastomer are preferably used, and a polyurethane based elastomer is more preferably used.

Alternatively, such an elastomer is not particularly limited, and may be selected ad libitum for use from among well-known thermoplastic elastomers, and nonthermoplastic elastomers; however, for use in melt forming, a thermoplastic elastomer is preferably used.

As the thermoplastic elastomer, at least one selected from the group consisting of a polystyrene based thermoplastic elastomer, a polyolefin based thermoplastic elastomer, a polydiene based thermoplastic elastomer, a polyvinyl chloride based thermoplastic elastomer, a chlorinated polyethylene based thermoplastic elastomer, a polyurethane based thermoplastic elastomer, a polyester based thermoplastic elastomer, a polyamide based thermoplastic elastomer and a fluorocarbon resin based thermoplastic elastomer may be exemplified. Of these, in light of ease of forming, at least one selected from the group consisting of a polystyrene based thermoplastic elastomer, a polyolefin based thermoplastic elastomer, a polydiene based thermoplastic elastomer, a polyurethane based thermoplastic elastomer, a polyester based thermoplastic elastomer and a polyamide based thermoplastic elastomer is preferably used, and a polyurethane based thermoplastic elastomer is more preferably used.

<Polystyrene Based Thermoplastic Elastomer>

A polystyrene based thermoplastic elastomer has an aromatic vinyl based polymer block (hard segment) and a rubber block (soft segment). Thus, the aromatic vinyl based polymer moiety serves as a bridging point through forming physical cross-linking, whereas the rubber block imparts rubber elasticity.

The polystyrene based thermoplastic elastomer is exemplified by, according to the arrangement pattern of the soft segment included therein, styrene-butadiene-styrene block copolymers (SBS); styrene-isoprene-styrene block copolymers (SIS); styrene-isobutylene-styrene block copolymers (SIBS); styrene-ethylene/butylene-styrene block copolymers (SEBS); styrene-ethylene/propylene-styrene block copolymers (SEPS), as well as block copolymers comprising crystalline polyethylene and an ethylene/butylene-styrene random copolymer obtained by hydrogenating a block copolymer of polybutadiene with a butadiene-styrene random copolymer; diblock copolymers comprising, for example, crystalline polyethylene and polystyrene obtained by hydrogenating a block copolymer of polybutadiene or an ethylene-butadiene random copolymer with polystyrene. It is to be noted that these polystyrene based thermoplastic elastomers may be modified products such as modified products with maleic anhydride, or the like.

Among these, in view of the balance of mechanical strength, heat resistance stability, weather resistance, chemical resistance, gas barrier properties, flexibility, processability and the like, styrene-isobutylene-styrene block copolymers (SIBS), styrene-ethylene/butylene-styrene block copolymers (SEBS) and styrene-ethylene/propylene-styrene block copolymers (SEPS) are preferred.

<Polyolefin Based Thermoplastic Elastomer>

The polyolefin based thermoplastic elastomer is exemplified by thermoplastic elastomers produced using polyolefin such as polypropylene or polyethylene as a hard segment, and an ethylene-propylene-diene copolymerized rubber or the like as a soft segment. There are polyolefin based thermoplastic elastomers of blend type and implant type. In addition, maleic anhydride-modified ethylene-butene-1 copolymer, maleic anhydride-modified ethylene-propylene copolymer, halogenated butyl based rubber, modified polypropylene, modified polyethylene and the like may be also exemplified.

<Polydiene Based Thermoplastic Elastomer>

The polydiene based thermoplastic elastomer is exemplified by 1,2-polybutadiene based TPE and trans 1,4-polyisoprene based TPE, hydrogenated conjugated diene based TPE, epoxidized natural rubber, modified products with maleic anhydride of these, and the like.

1,2-Polybutadiene based TPE is polybutadiene containing no less than 90% 1,2-bond in the molecule, and composed of crystalline syndiotactic 1,2-polybutadiene as a hard segment, and amorphous 1,2-polybutadiene as a soft segment.

On the other hand, trans 1,4-polyisoprene based TPE has no less than 98% trans 1,4-structure, and composed of a crystalline trans 1,4-segment as a hard segment, and a noncrystalline trans 1,4-segment as a soft segment.

<Polyvinyl Chloride (PVC) Based Thermoplastic Elastomer>

There are, in general, three types of polyvinyl chloride based thermoplastic elastomers (TPVC) as follows. It is to be noted that the TPVC which may be used includes modified products such as maleic anhydride-modified PVC.

(1) Blend Type TPVC of High-Molecular-Weight PVC/Plasticized PVC

In this type of TPVC, high-molecular-weight PVC is used as a hard segment to allow the microcrystalline parts have a cross-linking point, and PVC plasticized with a plasticizer is used as a soft segment.

(2) Blend Type TPVC of Partially Cross-linked PVC/Plasticized PVC

In this type of TPVC, PVC having a partially cross-linked or branched structure introduced thereto is used as a hard segment, and as a soft segment PVC plasticized with a plasticizer is used.

(3) Alloy Type TPVC of PVC/Elastomer

In this type of TPVC, PVC is used as a hard segment, and as a soft segment a rubber such as partially cross-linked NBR, polyurethane based TPE or polyester based TPE, or TPE is used.

<Chlorinated Polyethylene (CPE) Based Thermoplastic Elastomer>

The chlorinated polyethylene based thermoplastic elastomer is a soft resin obtained by allowing polyethylene in the form of an aqueous suspension liquid, or in a solvent such as carbon tetrachloride to react with chlorine gas. In CPE, a crystalline polyethylene moiety is used as a hard segment, and a chlorinated polyethylene moiety is used as a soft segment. In CPE, both moieties are present admixed to form a multi block or random structure.

CPE can have varying molecular characteristics such as the chlorine content, block feature and degree of residual crystallization depending on the type, degree of chlorination, conditions of production and the like of the material polyethylene, and consequently a variety of properties can be attained with a wide range of hardness of those including resins and rubbers. In addition, cross-linking of CPE enables to provide properties similar to those of vulcanized rubbers, and modified products may be also produced by modification with maleic anhydride.

<Polyester Based Thermoplastic Elastomer>

The polyester based thermoplastic elastomer (TPEE) is a multi block copolymer in which polyester is used as a hard segment, and a polyether or polyester having a low glass transition temperature (Tg) is used as a soft segment in the molecule. There are following types of TPEE depending on their molecular structures; however, (1) polyester-polyether type and (2) polyester-polyester type may be generally employed among these.

(1) Polyester-Polyether Type TPEE

In this type of TPEE, an aromatic crystalline polyester is used as a hard segment, and as a soft segment a polyether is used, in general.

(2) Polyester-Polyester Type TPEE

In this type of TPEE, an aromatic crystalline polyester is used as a hard segment, and as a soft segment an aliphatic polyester is used.

(3) Liquid Crystalline TPEE

In this type of TPEE, as a special hard segment, a rigid liquid crystal molecule is used, and as a soft segment an aliphatic polyester is used.

<Polyamide Based Thermoplastic Elastomer>

The polyamide based thermoplastic elastomer (TPA) is a multi block copolymer in which polyamide is used as a hard segment, and as a soft segment a polyether or polyester having low Tg is used. The component of polyamide is selected from nylon 6, 66, 610, 11, 12, etc., and nylon 6 or nylon 12 may be generally employed.

As a substance for constituting the soft segment, along chain polyol such as polyester diol or polyester diol may be used. Typical examples of the polyether include poly(oxytetramethylene) glycol (PTMG), poly(oxypropylene) glycol, and the like. Typical examples of the polyester diol include poly(ethyleneadipate) glycol, poly(butylene-1,4-adipate) glycol, and the like.

<Fluorine Contained Resin Based Thermoplastic Elastomer>

The fluorine contained resin based thermoplastic elastomer is an ABA type block copolymer composed of a fluorine contained resin as a hard segment, and as a soft segment a fluorine rubber. The fluorocarbon resin of the hard segment which may be used is a tetra fluoroethylene-ethylene copolymerized polymer or polyvinylidene fluoride (PVDF), whereas the fluorine rubber of the soft segment which may be used is a vinylidene fluoride-hexafluoropropylene-tetra fluoroethylene ternary copolymerized polymer, or the like. More specifically, those including a vinylidene fluoride based rubber, an ethylene tetra fluoride-propylene rubber, an ethylene tetra fluoride-perfluoromethylvinyl ether rubber, a phosphazene based fluorine rubber, a fluoro polyether, a fluoronitroso rubber or perfluorotriazine may be exemplified.

The fluorine contained resin based TPE forms a crosslinking point by the hard segment, similarly to other TPE, through microphase separation.

<Polyurethane Based Thermoplastic Elastomer>

Polyurethane based thermoplastic elastomer (TPU) is a linear multi block copolymer, etc., including (1) as a hard segment polyurethane obtained by a reaction of a short chain glycol (low molecular polyol) with isocyanate, and (2) as a soft segment polyurethane obtained by a reaction of a long chain glycol (high molecular polyol) with isocyanate. In this regard, polyurethane is a generic name of compounds having a urethane bond (—NHCOO—), obtained by a polyaddition reaction (urethanating reaction) of isocyanate (—NCO) with an alcohol (—OH).

In the multilayered structure of the present invention, lamination of the layer B constituted with a resin composition containing TPU as an elastomer is preferred since stretchability and thermoformability can be improved. In addition, this multilayered structure enables the inter layer adhesiveness between the layer B and the layer A described above to be strengthened, and is thus preferred since superior durability can be attained, and gas barrier properties and stretchability can be maintained even if used with deformation.

TPU is constituted with a high molecular polyol, an organic polyisocyanate, a chain extender and the like. This high molecular polyol is a substance having a plurality of hydroxyl groups, and may be obtained by polycondensation, addition polymerization (for example, ring-opening polymerization), polyaddition, or the like. Examples of the high molecular polyol include polyester polyol, polyether polyol, polycarbonate polyol, cocondensates thereof (for example, polyester-ether-polyol), and the like. These high molecular polyols may be used either alone of one type, or as a mixture of two types thereof. Of these, polyester polyol or polycarbonate polyol is preferred, and polyester polyol is particularly preferred.

The polyester polyol may be produced, for example, according to a conventional method, by allowing a dicarboxylic acid, an ester thereof or an ester formable derivative such as an anhydride thereof to be condensed with a low molecular polyol by way of a direct esterification reaction or a transesterification reaction, or by subjecting lactone to ring-opening polymerization.

The dicarboxylic acid that constitutes the dicarboxylic acid polyester polyol is not particularly limited, and generally employed dicarboxylic acid in producing a polyester may be used. Specific examples of the dicarboxylic acid include aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, trimethyladipic acid, 2-methyloctanedioic acid, 3,8-dimethyldecanedioic acid and 3,7-dimethyldecanedioic acid; alicyclic dicarboxylic acids such as cyclohexanedicarboxylic acid; aromatic dicarboxylic acids such as terephthalic acid, isophthalic acid, orthophthalic acid and naphthalenedicarboxylic acid, and the like. These dicarboxylic acids may be used either alone of one type, or as a mixture of two types thereof. Of these, due to having a carbonyl group that can be more readily reacted with a hydroxyl group of EVOH and the like in the layer A, and further enhancing the inter layer adhesiveness of the multilayered structure, aliphatic dicarboxylic acids having 6 to 12 carbon atoms are preferred, and adipic acid, azelaic acid or sebacic acid is particularly preferred.

The low molecular polyol is not particularly limited, and generally employed polyester polyol may be used. Specific examples of the low molecular polyol include aliphatic diols having 2 to 15 carbon atoms such as ethylene glycol, diethylene glycol, triethylene glycol, propyleneglycol, 1,3-propanediol, 2-methyl-1,3-propanediol, 1,3-butylene glycol, 1,4-butanediol, neopentyl glycol, 1,5-pentanediol, 3-methyl-1,5-pentanediol, 1,6-hexanediol, 1,8-octanediol, 2-methyl-1,8-octanediol, 2,7-dimethyl-1,8-octanediol, 1,9-nonanediol, 2-methyl-1,9-nonanediol, 1,10-decanediol and 2,2-diethyl-1,3-propanediol; alicyclic diols such as 1,4-cyclohexanediol, cyclohexanedimethanol, cyclooctanedimethanol and dimethylcyclooctanedimethanol; aromatic bivalent alcohols such as 1,4-bis(β-hydroxyethoxy)benzene, and the like. These low molecular polyols may be used either alone of one type, or as a mixture of two types thereof. Among these, aliphatic diols having 5 to 12 carbon atoms and having a methyl group on the side chain such as 3-methyl-1,5-pentanediol, 2-methyl-1,8-octanediol, 2,7-dimethyl-1,8-octanediol, 1,9-nonanediol and 2,8-dimethyl-1,9-nonanediol are preferred in terms of ease of occurrence of the reaction of the ester group in the polyester polyol with a hydroxyl group of EVOH and the like in the layer A, and the like, and possibility of providing more superior inter layer adhesiveness of the multilayered structure obtained. In addition, when two or more types of the low molecular polyols are used as a mixture, it is more preferred that such an aliphatic diol having 5 to 12 carbon atoms and having a methyl group on the side chain is used in a proportion of no less than 50 mol % with respect to the total amount of the low molecular polyol. Furthermore, together with the low molecular polyol, a small amount of low molecular polyol having three or more functionalities may be used in combination. Examples of the low molecular polyol having three or more functionalities include trimethylolpropane, trimethylolethane, glycerin, 1,2,6-hexanetriol, and the like.

Examples of the lactone include ε-caprolactone, β-methyl-δ-valerolactone, and the like.

Examples of the polyether polyol include polyethylene glycol, polypropylene glycol, polytetramethylene glycol, poly(methyltetramethylene) glycol, and the like. These polyether polyols may be used either alone of one type, or as a mixture of two types thereof. Among these, polytetramethylene glycol is preferred.

As the polycarbonate polyol, for example, a product obtained by condensation polymerization of aliphatic diol having 2 to 12 carbon atoms such as 1,4-butanediol, 1,5-pentanediol, 1,6-hexanediol, 1,8-octanediol or 1,10-decanediol, or a mixture of these with diphenyl carbonate or phosgene may be suitably used.

The lower limit of the number average molecular weight of the high molecular polyol is preferably 500, more preferably 600, and still more preferably 700. On the other hand, the upper limit of the number average molecular weight of the high molecular polyol is preferably 8,000, more preferably 5,000, and still more preferably 3,000. When the number average molecular weight of the high molecular polyol is less than the lower limit described above, miscibility with organic polyisocyanate is so high that the resulting TPU has inferior resilience, whereby dynamic characteristics such as stretchability and thermoformability of the multilayered structure obtained may be deteriorated. To the contrary, when the number average molecular weight of the high molecular polyol is beyond the upper limit described above, miscibility with organic polyisocyanate is so low that mixing in the polymerization procedure may be difficult, and as a result, stable production of TPU may fail resulting from generation of blocks of gelatinous matter, and the like. It is to be noted that the number average molecular weight of the high molecular polyol is determined in accordance with JIS-K-1577, which is a number average molecular weight calculated on the basis of the hydroxyl value.

The organic polyisocyanate is not particularly limited, and well-known organic diisocyanate generally employed in producing TPU may be used. Examples of the organic diisocyanate include aromatic diisocyanate such as 4,4'-diphenylmethanediisocyanate, tolylenediisocyanate, phenylenediisocyanate, xylylenediisocyanate, 1,5-naphthylene diisocyanate, 3,3'-dichloro-4,4'-diphenyl methanediisocyanate and toluoylenediisocyanate; aliphatic or alicyclic diisocyanate such as hexamethylenediisocyanate, isophoronediisocyanate, 4,4'-dicyclohexylmethanediisocyanate and xylylenediisocyanate hydride, and the like. Among these, in light of possibility of improving the strength and flex resistance of the multilayered structure obtained, 4,4'-diphenylmethanediisocyanate is preferred. These organic diisocyanate may be used either one type alone, or in combination of two or more types thereof.

As the chain extender, any chain extender generally employed for producing TPU may be used, and a low molecular compound having two or more active hydrogen atoms that can react with an isocyanate group in the molecule and having a molecular weight of no greater than 300 is suitably used. Examples of the chain extender include ethylene glycol, propylene glycol, 1,4-butanediol, 1,6-hexanediol, 1,4-bis(β-hydroxyethoxy)benzene and 1,4-cyclohexanediol, and the like. Among these, in light of stretchability and thermoformability of the multilayered structure obtained being more favorable, aliphatic diol having 2 to 10 carbon atoms is preferred, and 1,4-butanediol is particularly preferred. These chain extenders may be used either alone of one type, or as a mixture of two types thereof.

In a method for producing TPU, the aforementioned high molecular polyol, organic polyisocyanate and chain extender are used for producing TPU utilizing a well-known urethanating reaction technique, and any of a prepolymer method and a one-shot method may be used for the production. Of these, melt polymerization carried out under a condition substantially free from a solvent is preferred, and continuous melt polymerization carried out using a multi-screw extruder is particularly preferred.

In TPU, it is preferred that a ratio (isocyanate/(high molecular polyol+chain extender)) of the mass of the organic polyisocyanate to the total mass of the high molecular polyol and the chain extender be no greater than 1.02. When the ratio is beyond 1.02, stability in long-term operation during forming may be deteriorated.

The nitrogen content of TPU may be determined by appropriately selecting the ratio of the high molecular polyol and the organic diisocyanate employed, the content practically falls within the range of 1 to 7% by mass.

In addition, for the resin composition in the layer B, an adequate catalyst or the like for accelerating the reaction of the organic polyisocyanate and the high molecular polyol may be used if necessary. Moreover, the resin composition in the layer B may contain a variety of additives such as a resin other than the elastomer, a heat stabilizer, an ultra violet ray absorbing agent, an antioxidant, a colorant and a filler, in the range not to impair the object of the present invention. When the resin composition in the layer B contains an additive, the amount thereof is preferably no greater than 50% by mass, more preferably no greater than 30% by mass, and is preferably no greater than 10% by mass with respect to the total amount of the resin composition.

The hardness of elastomer such as TPU in the resin composition in the layer B is, in terms of Shore A hardness, preferably 50 to 95, more preferably 55 to 90, and still more preferably 60 to 85. Use of TPU having a hardness falling within the above range is preferred, since a laminated structure that is superior in mechanical strength and durability, and has excellent flexibility is obtained.

<Metal Salt>

In the multilayered structure, at least one of the resin compositions of the layer A and the layer B preferably contains a metal salt. By thus including a metal salt in at least one of the layer A and the layer B, very superior inter layer adhesiveness between the layer A and the layer B can be achieved. Owing to such very superior inter layer adhesiveness, the multilayered structure has superior durability. Although the reason for improvement of the inter layer adhesiveness of the metal salt is not necessarily clear, it is believed that the improvement would result from, for example, acceleration of a bond forming reaction that occurs between the EVOH, etc., in the resin composition in the layer A, and the TPU, etc., in the resin composition in the layer B owing to the presence of the metal salt, and the like. As such a bond forming reaction, a hydroxyl group exchange reaction that occurs between a carbamate group of TPU with a hydroxyl group of EVOH, an addition reaction of a hydroxyl group of EVOH to a remaining isocyanate group in TPU, and the like may be assumed. It should be noted that the metal salt may be included in both the resin composition in the layer A and the resin composition in the layer B, or either one of the resin composition in the layer A or the resin composition in the layer B.

Although the metal salt is not particularly limited, an alkali metal salt, an alkaline earth metal salt or a metal salt of a d-block metal listed in group 4 of periodic table is preferred since the inter layer adhesiveness can be further enhanced. Among these, an alkali metal salt or an alkaline earth metal salt is more preferred, and an alkali metal salt is particularly preferred.

The alkali metal salt is not particularly limited, and examples thereof include aliphatic carboxylic acid salts, aromatic carboxylic acid salts, phosphoric acid salts, metal complexes of lithium, sodium, potassium, etc., and the like. Specific examples of the alkali metal salt include sodium acetate, potassium acetate, sodium phosphate, lithium phosphate, sodium stearate, potassium stearate, a sodium salt of ethylenediamine tetra acetic acid, and the like. Among these, sodium acetate, potassium acetate and sodium phosphate are particularly preferred, in light of being easily available.

The alkaline earth metal salt is not particularly limited, and examples thereof include acetic acid salts or phosphoric acid salts of magnesium, calcium, barium, beryllium, or the like. Among these, acetic acid salts or phosphoric acid salts of magnesium or calcium are particularly preferred, in light of being easily available. To include such an alkaline earth metal salt is also advantageous in capability of reducing the amount of adhesion to a die of a forming machine of the resin yielded by heat deterioration during melt forming.

Although the metal salt of a d-block metal listed in group 4 of periodic table is not particularly limited, example thereof include carboxylic acid salts, phosphoric acid salts or acetylacetonato salts of titanium, vanadium, chromium, manganese, iron, cobalt, nickel, copper, zinc, etc., and the like.

The lower limit of the content of the metal salt (content in terms of metal element equivalent on the basis of the entire multilayered structure) is preferably 1 ppm by mass, more preferably 5 ppm by mass, still more preferably 10 ppm by mass, and particularly preferably 20 ppm by mass. On the other hand, the upper limit of the content of the metal salt is preferably 10,000 ppm by mass, more preferably 5,000 ppm by mass, still more preferably 1,000 ppm by mass, and particularly preferably 500 ppm by mass. When the content of the metal salt is less than the lower limit described above, the inter layer adhesiveness may be inferior, and thus the durability of the multilayered structure may be deteriorated. To the contrary, when the content of the metal salt is beyond the upper limit described above, coloring of the resin composition may be significant, whereby the appearance of the multilayered structure may be deteriorated.

The lower limit of the content of the metal salt with respect to each resin composition containing the metal salt is preferably 5 ppm by mass, more preferably 10 ppm by mass, still more preferably 20 ppm by mass, and particularly preferably 50 ppm by mass. On the other hand, the upper limit of the content of the metal salt is preferably 5,000 ppm by mass, more preferably 1,000 ppm by mass, still more preferably 500 ppm by mass, and particularly preferably 300 ppm by mass. When the content of the metal salt is less than the lower limit described above, adhesiveness to other adjacent layer may be inferior, and thus the durability of the multilayered structure may be deteriorated. To the contrary, when the content of the metal salt is beyond the upper limit described above, coloring of the resin composition may be significant, whereby the appearance of the multilayered structure may be deteriorated.

The metal salt may be included in the resin composition in the layer A or the layer B by any method, which is not particularly limited, and a method similar to one for including a phosphate compound or the like in the resin composition in the layer A as described above may be employed.

<Radical Cross-Linking Agent>

In the multilayered structure of the present invention, the resin composition(s) constituting the layer A and/or the layer B preferably contains a radical cross-linking agent. When the multilayered structure having the layer A and/or the layer B constituted with a resin composition containing a radical cross-linking agent is irradiated with an active energy ray, cross-linking effect upon irradiation with the active energy ray is enhanced, and the inter layer adhesiveness between the layer A and the layer B is further improved, thereby leading to further improvement of gas barrier properties. In addition, a decrease in the dose of irradiation with an active energy ray is enabled in comparison with the case in which a radical cross-linking agent is not present.

The radical cross-linking agent is not particularly limited, and examples include poly(meth)acrylates of polyhydric alcohols such as trimethylolpropane trimethacrylate, diethylene glycol diacrylate and neophenylene glycol diacrylate, triallyl isocyanurate, triallyl cyanurate, and the like. These may be used either alone, or in combination of two or more thereof.

The content of the radical cross-linking agent with respect to the resin composition containing the radical cross-linking agent before irradiating with an active energy ray is preferably no less than 0.01% by mass and no greater than 10% by mass, and more preferably no less than 0.05% by mass and no greater than 9% by mass. In light of a balance of a cross-linking effect and an economical efficiency, the content of the radical cross-linking agent is preferably no less than 0.1% by mass and no greater than 8% by mass.

The method for including the radical cross-linking agent in the resin composition is not particularly limited, and for example, a method in which the resin composition is subjected to melt kneading using a biaxial extruder, etc., and the like may be employed.

<Relationship Between Layer A and Layer B>

The peel resistance between the layer A and the layer B in the multilayered structure of the present invention as determined after heating at 180° C. for 15 minutes in accordance with JIS-K6854 at 23° C. in an atmosphere of and 50% RH, at a tension rate of 50 mm/min is preferably no less than 25 N/25 mm, more preferably no less than 27 N/25 mm, still more preferably no less than 30 N/25 mm, and particularly preferably no less than 50 N/25 mm. Thus, very superior inter layer adhesiveness is provided between the layer A and the layer B.

With regard to the inter layer relationship of the multilayered structure, it is believed that cross-linking reactions between molecules may occur at the interface between the layer A and the layer B upon irradiation with an active energy ray, leading to rigid binding, whereby superior inter layer adhesiveness is attained. It is to be noted that, when a bond-forming reaction is caused, for example, between EVOH, etc., in the resin composition in the layer A, and TPU, etc., in the resin composition in the layer B (e.g., a hydroxyl group exchange reaction that occurs between a carbamate group of TPU and a hydroxyl group of EVOH, an addition reaction of a hydroxyl group of EVOH to a remaining isocyanate group in TPU, and the like) due to the metal salt included as described above, more superior inter layer adhesiveness is attained, and gas barrier properties, durability and the like of the multilayered structure can be further improved. Moreover, by including the radical cross-linking agent in the layer A and/or the layer B, and irradiating with an active energy ray as described above, a cross-linking reaction is further promoted, and thus the inter layer adhesiveness can be further improved.

<Method for Producing the Multilayered Structure>

A method for producing the multilayered structure of the present invention is not particularly limited as long as the method can favorably laminate and adhere the layer A and the layer B, and any of well-known methods such as e.g., coextrusion, pasting, coating, bonding, and attaching may be employed. The method for producing the multilayered structure is specifically exemplified by (1) a method for producing the multilayered structure having a layer A and a layer B by a multilayer coextrusion process using a resin composition for forming the layer A and a resin composition for forming the layer B, (2) a method for producing the multilayered structure having a layer A and a layer B by overlaying a plurality of laminates via an adhesive using a resin composition for forming the layer A and a resin composition for forming the layer B, followed by stretching, and the like. Among these, in light of superior productivity, and excellent inter layer adhesiveness, (1) the method for producing the multilayered structure by a multilayer coextrusion process using a resin composition for forming the layer A and a resin composition for forming the layer B is preferred.

In the multilayer coextrusion process, the multilayered structure is formed by: heat melting the resin composition for forming the layer A and the resin composition for forming the layer B; supplying the melted resin compositions into an extrusion die from each distinctive extruder and pump through each channel; extruding from the extrusion die to give a multilayer; and thereafter allowing for lamination and adhesion. As the extrusion die, for example, a multimanifold die, a field block, a static mixer, or the like may be used.

In the multilayered structure, a multilayer laminate obtained in this manner is irradiated with an active energy ray as described above to promote the cross-linking reaction, whereby the inter layer adhesiveness between the layer A and the layer B is further improved. Since the multilayered structure is thus formed by irradiating with an active energy ray, the inter layer adhesiveness is improved, and as a result, gas barrier properties and flex resistance can be improved.

The active energy ray as referred to means electromagnetic wave or charged particle rays having an energy quantum. Specifically, ultra violet rays, γ-rays, electron beams and the like may be included. Among these active energy rays, electron beams are preferred in light of effects of improving the inter layer adhesiveness. Use of electron beams as the active energy ray enables the inter layer cross-linking reaction to be further promoted, whereby the inter layer adhesiveness of the multilayered structure can be further improved.

Upon irradiation with an electron beam, any of various types of electron beam accelerator of, for example, Cockroft-Walton's type, van de Graaff type, resonance transformer type, insulating core transformer type, linear type, dynamitron type, high frequency type or the like may be used as an electron beam source, and the irradiation may be carried out typically at an accelerating voltage of 100 to 500 kV within a range of an irradiation dose of 5 to 600 kGy.

In addition, when an ultra violet ray is used as the active energy ray, an ultra violet ray having a wavelength of 190 to 380 nm is preferably included for the irradiation. The ultra violet ray source is not particularly limited, and for example, a high-pressure mercury vapor lamp, a low-pressure mercury vapor lamp, a metal halide lamp, a carbon arc lamp, or the like may be used.

As described above, the multilayered structure of the present invention is superior in inter layer adhesiveness, and has superior gas barrier properties, stretchability, thermoformability and durability. Therefore, the multilayered structure can be used in applications for which superior gas barrier properties are required, such as, for example, retort vessels, wrapping materials for food and medicine, inner liners of pneumatic tires, and the like. Of these, the multilayered structure is suitably used for inner liners of pneumatic tires for which superior gas barrier properties, stretchability, crack resistance, durability, etc., are particularly desired.

The multilayered structure of the present invention is not limited to the foregoing embodiments. For example, in addition to the layer A and the layer B, other layer may be included. Although the type of the resin composition constituting the other layer is not particularly limited, it is preferably highly adhesive to the layer A and/or the layer B. The other layer particularly preferably has a molecular chain having a functional group capable of yielding a bond by a reaction with: a hydroxyl group that, for example, the EVOH in the layer A has; and/or a carbamate group or an isocyanate group in the molecular chain of, for example, TPU in the layer B.

<Inner Liner for Pneumatic Tires>

The inner liner for pneumatic tires of the present invention has the multilayered structure. Due to having the multilayered structure, the inner liner is superior in gas barrier properties, inter layer adhesiveness and flex resistance, and reduction in weight is also enabled.

The inner liner has a thickness of preferably no less than 0.1 μm and no greater than 1,000 μm, more preferably no less than 0.5 μm and no greater than 750 μm, and particularly preferably no less than 1 μm and no greater than 500 μm. Even though the thickness is so small the inner liner has superior gas barrier properties and flex resistance, and also superior in inter layer peel resistance. Additionally, the inner liner enables reduction in weight since such thinning is permitted.

<Pneumatic Tire>

The pneumatic tire shown in FIG. 1 illustrating one embodiment of the pneumatic tire of the present invention has: a bead core 1; a carcass layer 2 provided to cover around the bead core 1 and a bead filler 7 and includes a carcass ply, the cord direction of which is directed to the radial direction; an inner liner 3 provided on the internal side of the carcass layer 2 with respect to the radius direction of tire; a belt portion having two belt layers 4 disposed on the external side of a crown member of the carcass layer 2 with respect to the radius direction of the tire; a tread layer 5 disposed on the belt portion; and a side wall layer 6 disposed on both sides of the tread layer 5. As the inner liner 3, the inner liner (multilayered structure) of the present invention described above is used.

The inner liner 3 in the pneumatic tire 1 is a multilayered structure having at least 7 layers in total of the layer A and the layer B as described above, and has superior characteristics such as gas barrier properties and flex resistance. Therefore, the pneumatic tire 1 having the inner liner 3 of the present invention is excellent in a capacity of retaining internal pressure, and thus can maintain the performance of retaining internal pressure even after deformed by flexion in use. Furthermore, since the thickness of the inner liner 3 can be decreased, reduction in weight of the pneumatic tire 1 is enabled, and in turn, fuel efficiency of cars and the like equipped with the tire 1 can be improved.

It is to be noted that inert gas such as air or nitrogen may be used as a gas filled, in the pneumatic tire of the present invention.

The structure of the pneumatic tire is not particularly limited and may be modified in various modes as long as the tire includes the inner liner of the present invention constituted as described above. The pneumatic tire can be suitably applied to tires for cars, large tires, off-the-road tires, tires for motorcycles, tires for airplanes, tires for agricultural vehicles, and the like.

EXAMPLES

Next, the present invention will be explained in more detail by way of Examples, but the present invention is not in any way limited thereto.

Production Example 1: Production of EVOH Pellet (A-1a)

Into a polymerization tank equipped with a cooling device and a stirrer were charged 20,000 parts by mass of vinyl acetate, 1,020 parts by mass of methanol, 3.5 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 5.9 MPa, and the temperature and the pressure were kept for 4 hours while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 30% with respect to vinyl acetate charged. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 44.5 mol %, and a content of vinyl acetate units of 55.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hours. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-1) having a degree of saponification of 99.5%.

The EVOH (A-1) thus obtained was subjected to a treatment with an aqueous solution containing acetic acid and orthoboric acid (OBA) (an aqueous solution containing 0.3 g of acetic acid, 0.06 g of phosphoric acid and 0.35 g of orthoboric acid dissolved in 1 L), at a bath ratio of 20, followed by drying and pelletization with an extruder to give an EVOH pellet (A-1a). The MFR of the pellet (A-1a) was 4.6 g/10 min (190° C., under a load of 21.18 N). In addition, the pellet (A-1a) had a content of acetate of 90 ppm by mass, a content of the phosphate compound in terms of phosphoric acid radical equivalent of 43 ppm by mass, and a content of the boron compound in terms of a boron equivalent value of 260 ppm by mass.

Production Example 2: Production of EVOH Pellet (A-1b)

The EVOH pellet (A-1a) obtained in Production Example 1 was melt mixed with trimethylolpropane trimethacrylate as a radical cross-linking agent such that the content in the pellet became 4% by mass using a biaxial extruder at 210° C. to produce a pellet (A-1b).

Production Example 3: Production of EVOH Pellet (A-2a)

The EVOH (A-1) having a degree of saponification of 99.5% obtained in Production Example 1 was subjected to a treatment with an aqueous solution containing acetic acid and sodium hydrogenphosphate (an aqueous solution containing 0.05 g of acetic acid, 0.02 g of sodium hydrogenphosphate and 0.03 g of orthoboric acid dissolved in 1 L), at a bath ratio of 20, followed by drying to give EVOH composition particles. The EVOH composition particles had an MFR of 4.6 g/10 min (190° C., under a load of 21.18 N). In addition, the EVOH composition particles had a content of acetate of 40 ppm by mass, and a content of the phosphate compound in terms of phosphoric radical group equivalent of 20 ppm by mass.

Using the EVOH composition particles obtained as described above, epoxypropane was allowed to react with EVOH by means of a biaxial extruder "TEM-35BS" (diameter: 37 mm, L/D=52.5) manufactured by Toshiba Machine Co., Ltd. under the extrusion conditions as in the following while adding a catalyst. Unreacted epoxypropane was eliminated from a vent, and then a 8.2% by mass aqueous ethylenediamine tetraacetate trisodium hydrate solution was added as a catalyst quencher to permit pelletization, followed by drying to give a pellet (A-2a) that includes epoxypropane-modified ethylene-vinyl alcohol copolymer EVOH (A-2) having the following structure as a structural unit (II) other than the ethylene unit and the vinyl alcohol unit.

$$\begin{array}{c} -CH_2CH- \\ | \\ O \\ | \\ CH_3-C-H \\ | \\ H-C-H \\ | \\ OH \end{array}$$

(Extrusion Condition)
Cylinder, die temperature settings:
  resin feed port/cylinder part/adaptor/die=160/200/240/240 (° C.)
Screw rotation speed: 400 rpm
Ethylene-vinyl alcohol copolymer feed rate: 16 kg/hour
Epoxypropane feed rate: 2.4 kg/hour (pressure during feeding: 6 MPa)
Catalyst solution feed rate: 0.32 kg/hour
Preparation of catalyst: Zinc acetylacetonato monohydrate in an amount of 28 parts by mass was mixed with 957 parts by mass of 1,2-dimethoxyethane to give a mixed solution. To thus resulting mixed solution were added 15 parts by mass of trifluoromethane sulfonic acid while stirring, whereby a catalyst solution was obtained. In other words, 1 mol of trifluoromethane sulfonic acid was added to 1 mol of zinc acetylacetonato monohydrate to prepare a mixed solution.
Aqueous catalyst quencher solution feed rate: 0.16 kg/hour
MFR of the resulting pellet (A-2a) was 3.2 g/10 min (190° C., under a load of 21.18 N). In addition, the pellet (A-2a)

had a content of acetic acid of 420 ppm by mass, a content of zinc ion of 120 ppm by mass, a content of sodium of 130 ppm by mass, a content of the phosphate compound in terms of phosphoric radical equivalent of 20 ppm by mass, a content of trifluoromethane sulfonate ion of 280 ppm by mass, and a content of the boron compound in terms of a boron equivalent value of 12 ppm by mass. In addition, the amount of the structural unit (II) other than the ethylene unit and the vinyl alcohol unit of the EVOH (A-2a) introduced (amount of modification of epoxybutane) was, as determined by $^1$H-NMR (internal standard substance: tetramethylsilane; solvent: d6-DMSO) was 5.8 mol %.

Production Example 4: Production of EVOH Pellet (A-2b)

The EVOH pellet (A-2a) obtained in Production Example 3 was melt mixed with trimethylolpropane trimethacrylate as a radical cross-linking agent such that the content in the pellet became 4% by mass using a biaxial extruder at 210° C. to produce a pellet (A-2b).

Production Example 5: Production of EVOH Pellet (A-3)

Into a polymerization tank equipped with a cooling device and a stirrer were charged 20,000 parts by mass of vinyl acetate, 2,000 parts by mass of methanol, 10 parts by mass of 2,2'-azobis-(4-methoxy-2,4-dimethylvaleronitrile) as a polymerization initiator, and replacement with nitrogen was carried out while stirring. Thereafter, ethylene was introduced thereto, followed by adjusting the internal temperature to 60° C. and the ethylene pressure to 4.5 MPa, and the temperature and the pressure were kept for 4 hours while stirring to permit polymerization. Next, sorbic acid (SA) in an amount of 10 parts by mass (0.05% by mass with respect to vinyl acetate charged) was dissolved in methanol to prepare a 1.5% by mass solution, which was added to the polymerization tank. The degree of polymerization was 45% with respect to vinyl acetate charged. The copolymerization reaction liquid was supplied to the purge column, and after unreacted vinyl acetate was eliminated from the top of the tower by introduction of methanol steam from the bottom of the tower, a 40% by mass methanol solution of the copolymer was obtained. The copolymer had a content of ethylene units of 32.5 mol %, and a content of vinyl acetate units of 67.5 mol %.

A methanol solution of the copolymer was introduced into a saponification reaction vessel, and then a sodium hydroxide/methanol solution (85 g/L) was added so as to attain 0.5 equivalent with respect to the vinyl acetate component in the copolymer. Thereto was further added methanol to adjust the copolymer concentration of 15% by mass. The temperature in the reaction vessel was elevated to 60° C., and the reaction was allowed while blowing nitrogen gas into the reaction vessel for 5 hours. Thereafter, the reaction was stopped by neutralizing with acetic acid, and the content was removed from the reaction vessel and was allowed for deposition in a particulate form by leaving to stand at ordinary temperature. An operation including deliquoring deposited particles with a centrifugal separator and further adding a large amount of water followed by deliquoring was repeated to obtain EVOH (A-3) having a degree of saponification of 99.5%.

The EVOH (A-3) thus obtained was subjected to a treatment with an aqueous solution containing acetic acid, phosphoric acid and orthoboric acid (OBA) (an aqueous solution containing 0.3 g of acetic acid, 0.06 g of phosphoric acid and 0.35 g of orthoboric acid dissolved in 1 L), at a bath ratio of 20, followed by drying and pelletization with an extruder to give an EVOH pellet (A-3). The MFR of the pellet (A-3) was 1.6 g/10 min (190° C., under a load of 21.18N). In addition, the pellet (A-3) had a content of acetate of 90 ppm by mass, a content of the phosphate compound in terms of phosphoric acid radical equivalent of 43 ppm by mass, and a content of the boron compound in terms of a boron equivalent value of 260 ppm by mass.

Features of the pellet (A-1a), pellet (A-2a) and pellet (A-3) obtained in the aforementioned Production Examples 1, 3 and 5, respectively, are shown in Table 1.

TABLE 1

|  | Production Example 1 | Production Example 3 | Production Example 5 |
|---|---|---|---|
| Type of pellet | EVOH pellet (A-1a) | EVOH pellet (A-2a) | EVOH pellet (A-3) |
| Ethylene unit content (mol %) | 44.5 | 44.5 | 32.5 |
| Degree of saponification (mol %) | 99.5 | 99.5 | 99.5 |
| Content of phosphate compound (ppm by mass) | 43 | 20 | 43 |
| Content of acetate (ppm by mass) | 90 | 420 | 90 |
| Content of boron compound (ppm by mass) | 260 | 12 | 260 |
| Metal salt metal species in the pellet | — | Na/Zn | — |
| Metal salt content in terms of metal element equivalent (ppm by mass) | — | 130/120 | — |
| MFR (190° C., 21.18 N) (g/10 min) | 4.6 | 3.2 | 1.6 |

Note:
The content of the phosphate compound is a value in terms of phosphoric acid radical equivalent, and the content of the boron compound is a value in terms of boron equivalent.

Production Example 6: Production of Nylon MXD6 Pellet (A-4)

Into a reaction chamber equipped with a stirrer and a partial condenser were added 600 parts by mass of purified adipic acid, and heated under a nitrogen stream to melt the content. Thereafter, when heated to 180° C., 560 parts by mass of m-xylylenediamine having a purity of 99.93% by mass was added dropwise under normal pressure while further elevating the temperature. When the internal temperature reached 250° C., the dropwise addition of m-xylylenediamine was ceased, and the mixture was further stirred under normal pressure for additional 1 hour after the internal temperature reached 255° C. Thereafter, the reaction product was recovered, and then pulverized after air-cooled to obtain particulate poly m-xylyleneadipamide. The particulate matter thus obtained was charged into a rolling vacuum solid phase polymerization apparatus, and an operation including reducing the pressure to no greater than 200 Pa while rotating at 10 rpm, and raising up to normal pressure with no less than 99% by volume nitrogen was repeated three times. Thereafter, the internal temperature of the solid phase polymerization apparatus was elevated from the room temperature to 220° C. at a rate of temperature rise of 50° C./hour to carry out solid phase polymerization by heating the particulate matter. Specifically, in the solid phase polymerization, vacuum operation was started when the temperature of the particulate matter reached 135° C., and cooling was started 360 min after the temperature of the particulate matter reached 150° C. under normal pressure in nitrogen. Thereafter, when the temperature of the particulate matter became no greater than 80° C. under nitrogen stream, fine powder attached onto the surface of the particulate matter was eliminated to coordinate the size of the particulate matter to 6 to 10 mesh. After the resulting particulate matter was subjected to melt extrusion using a biaxial extruder at 260° C. to give a strand, pelletization was carried out to obtain a pellet (A-4) of nylon MXD6. The resulting pellet (A-4) had a Vicat softening temperature of 225° C.

Production Example 7: Production of PGA Pellet (A-5)

Glycolic acid (manufactured by Wako Pure Chemical Industries, Ltd.) was charged into an autoclave reaction vessel, and the temperature was elevated to 200° C. by heating over about 2 hours while stirring to allow for condensation while generated water was distilled off. Subsequently, a low-boiling point fraction was distilled off by reducing the pressure to 20 kPa and keeping the same for 2 hours to prepare a glycolic acid oligomer. The glycolic acid oligomer in an amount of 120 parts by mass was charged into a reaction chamber, and thereto were added 500 parts by mass of benzylbutyl phthalate (manufactured by Junsei Chemical Co., Ltd.) as a solvent, and 15 parts by mass of polypropylene glycol (manufactured by Junsei Chemical Co., Ltd., #400) as a solubilizing agent. In a nitrogen gas atmosphere, solution-phase depolymerization of the glycolic acid oligomer was permitted by heating the mixture to about 270° C. under a pressure of 5 kPa, and thus produced glycolide was codistilled with benzylbutyl phthalate. To the resulting codistillate was added cyclohexane in a volume of about 2 times, thereby allowing the glycolide to be precipitated from benzylbutyl phthalate, and the glycolide was filtered off. The filtered matter was recrystallized with ethyl acetate, and dried under reduced pressure to obtain purified glycolide. The synthetic glycolide in an amount of 100 parts by mass, 0.006 parts by mass of tin octanoate and 0.05 parts by mass of lauryl alcohol were charged into a reaction chamber, and polymerization was allowed at 220° C. for 3 hours. Following the polymerization, the produced polymer was removed after cooling and pulverized to obtain a particulate polymer. The particulate matter was washed with acetone, vacuum dried at 30° C., and the size of the obtained particulate matter was adjusted. After the resulting particulate matter was subjected to melt extrusion using a biaxial extruder at 240° C. to give a strand, pelletization was carried out to obtain a pellet (A-5) of polyglycolic acid (PGA). The resulting pellet (A-5) had a Vicat softening temperature of 204° C.

Production Example 8: Production of Wholly Aromatic Liquid Crystal Polyester Resin Pellet (A-6)

Into a reaction vessel equipped with a stirrer, a vacuum port and a feed port of nitrogen were charged 108 parts by mass of p-acetoxybenzoic acid, and 76.8 parts by mass of 0.70 dl/g polyethylene terephthalate having a limiting viscosity as determined using a mixed solvent of an equivalent mass of phenol/tetrachloroethane at 30° C. After the air in the reaction system was replaced with nitrogen three times, the mixture was stirred under a nitrogen stream at 280° C. for about 1 hour, whereby acetic acid in an amount of about 90% of theoretical amount of distillation was distilled off. Subsequently, the pressure of the system was gradually reduced to allow for a reaction at a final pressure of no greater than 1 mmHg. When the polymerization reaction was completed, the resulting reaction product was extruded from a nozzle in the form of a strand and cut to give a cylindrical pellet (A-6) of a wholly aromatic liquid crystal polyester. The resulting pellet (A-6) had a Vicat softening temperature of 193° C.

Production Example 9: Production of TPU Pellet (B-1a)

A mixture of: 68.8% by mass of polyester diol having 2.0 hydroxyl groups per molecule and having a number average molecular weight of 1,000, obtained by allowing 1,4-butanediol to react with adipic acid; 27.5% by mass of 4,4-diphenyl methanediisocyanate; and 3.7% by mass of 1,4-butanediol was subjected to melt kneading by means of a multiscrew extruder (die temperature: 260° C.) for 20 min to produce a thermoplastic polyurethane resin TPU (B-1) (Shore A hardness: 85). Then the thermoplastic polyurethane resin was pelletized to obtain a TPU pellet (B-1a).

Production Example 10: Production of TPU Pellet (B-1b)

The TPU pellet (B-1a) obtained in Production Example 9 was melt mixed with trimethylolpropane trimethacrylate as a radical cross-linking agent such that the content in the pellet became 4% by mass using a biaxial extruder at 230° C. to produce a pellet (B-1b).

Production Example 11: Production of TPU Pellet (B-2a)

With 100 parts by mass of TPU (B-1) obtained in Production Example 9, 0.37 parts by mass of sodium stearate were melt mixed by means of a biaxial extruder at 230° C. to produce a TPU pellet (B-2a) (Shore A hardness: 90). The content of sodium ion in the pellet (B-2a) was 140 ppm by mass.

Production Example 12: Production of TPU Pellet (B-2b)

Trimethylolpropane trimethacrylate as a radical cross-linking agent was added such that the content in the pellet became 4% by mass, together with sodium stearate in Production Example 11, and melt mixing was carried out to obtain a pellet (B-2b).

Production Example 13: Production of TPU Pellet (B-3a)

With 100 parts by mass of ether type TPU (manufactured by Kuraray Co., Ltd., trade name: "Kuramiron™ 9180"; Shore A hardness: 80), 0.27 parts by mass of magnesium stearate were melt mixed by means of a biaxial extruder at 230° C. to produce a pellet (B-3a). The content of magnesium ion in the pellet (B-3a) was 110 ppm by mass.

Production Example 14: Production of TPU Pellet (B-3b)

Trimethylolpropane trimethacrylate as a radical cross-linking agent was added such that the content in the pellet became 4% by mass, together with magnesium stearate in Production Example 13, and melt mixing was carried out to produce a pellet (B-3b).

Production Example 15: Production of Amide Based Elastomer Pellet (B-4)

With 100 parts by mass of an amide based elastomer pellet (manufactured by Daicel-Evonik. Ltd., trade name "E40-S1"), 0.27 parts by mass of magnesium stearate and 4 parts by mass of trimethylolpropane trimethacrylate as a radical cross-linking agent were melt mixed by means of a biaxial extruder at 240° C. to produce a pellet (B-4). The content of magnesium ion in the pellet (B-4) was 110 ppm by mass, and the content of the radical cross-linking agent was 4% by mass.

Production Example 16: Production of Polyamide 12 Elastomer Pellet (B-5)

With 100 parts by mass of a polyamide 12 elastomer pellet (manufactured by Ube Industries, Ltd., trade name "UBESTA XPA"), 0.27 parts by mass of magnesium stearate and 4 parts by mass of trimethylolpropane trimethacrylate as a radical cross-linking agent were melt mixed by means of a biaxial extruder at 240° C. to produce a pellet (B-5). The content of magnesium ion in the pellet (B-5) was 110 ppm by mass, and the content of the radical cross-linking agent was 4% by mass.

Production Example 17: Production of Maleic Anhydride-Modified Ethylene-Butene-1 Copolymer Elastomer Pellet (B-6)

With 100 parts by mass of a maleic anhydride-modified ethylene-butene-1 copolymer elastomer pellet (manufactured by Mitsui Chemicals, Inc., trade name "TAFMER MH7010"), 0.37 parts by mass of sodium stearate and 4 parts by mass of trimethylolpropane trimethacrylate as a radical cross-linking agent were melt mixed by means of a biaxial extruder at 210° C. to produce a pellet (B-6). The content of sodium ion in the pellet (B-6) was 140 ppm by mass, and the content of the radical cross-linking agent was 4% by mass.

Production Example 18: Production of Maleic Anhydride-Modified Ethylene-Propylene Copolymer Elastomer Pellet (B-7)

With 100 parts by mass of a maleic anhydride-modified ethylene-propylene copolymer elastomer pellet (manufactured by Mitsui Chemicals, Inc., trade name "TAFMER MP0610"), 0.37 parts by mass of sodium stearate and 4 parts by mass of trimethylolpropane trimethacrylate as a radical cross-linking agent were melt mixed by means of a biaxial extruder at 210° C. to produce a pellet (B-7). The content of sodium ion in the pellet (B-7) was 140 ppm by mass, and the content of the radical cross-linking agent was 4% by mass.

Production Example 19: Production of Modified Polypropylene Based Elastomer Pellet (B-8)

With 100 parts by mass of a modified polypropylene based elastomer pellet (manufactured by Japan Polyolefins Co., Ltd., trade name "ADTEX ER320P"), 0.37 parts by mass of sodium stearate and 4 parts by mass of trimethylolpropane trimethacrylate as a radical cross-linking agent were melt mixed by means of a biaxial extruder at 210° C. to produce a pellet (B-8). The content of sodium ion pellet in the (B-8) was 140 ppm by mass, the content of the radical cross-linking agent was 4% by mass.

Production Example 20: Production of Modified Polyethylene Based Elastomer Pellet (B-9)

With 100 parts by mass of a modified polyethylene based elastomer pellet (manufactured by Mitsui Chemicals, Inc., trade name "ADMER NB508"), 0.37 parts by mass of sodium stearate and 4 parts by mass of trimethylolpropane trimethacrylate as a radical cross-linking agent were melt mixed by means of a biaxial extruder at 210° C. to produce a pellet (B-9). The content of sodium ion in the pellet (B-9) was 140 ppm by mass, and the content of the radical cross-linking agent was 4% by mass.

Production Example 21: Production of Modified Styrene Based Elastomer Pellet (B-10)

With 100 parts by mass of a modified styrene based elastomer pellet (manufactured by JSR Corporation, trade name "DYNARON 8630P"), 0.27 parts by mass of magnesium stearate and 4 parts by mass of trimethylolpropane trimethacrylate as a radical cross-linking agent were melt mixed by means of a biaxial extruder at 240° C. to produce a pellet (B-10). The content of magnesium ion in the pellet (B-10) was 110 ppm by mass, and the content of the radical cross-linking agent was 4% by mass.

Production Example 22: Production of Modified Styrene Based Elastomer Pellet (B-11)

With 100 parts by mass of a modified styrene based elastomer pellet (manufactured by JSR Corporation, trade name "DYNARON 4630P"), 0.27 parts by mass of magnesium stearate and 4 parts by mass of trimethylolpropane trimethacrylate as a radical cross-linking agent were melt mixed by means of a biaxial extruder at 240° C. to produce a pellet (B-11). The content of magnesium ion in the pellet (B-11) was 110 ppm by mass, and the content of the radical cross-linking agent was 4% by mass.

Production Example 23: Production of Epoxidized Natural Rubber Pellet (B-12)

With 100 parts by mass of an epoxidized natural rubber (manufactured by Mu-ang. Mai Guthrie Public Company, trade name "EPOXY PRENE 25"), 0.37 parts by mass of sodium stearate and 4 parts by mass of trimethylolpropane trimethacrylate as a radical cross-linking agent were melt mixed by means of a biaxial extruder at 210° C., and extruded. The strand thus obtained was cut to produce a pellet (chip) (B-12). The content of sodium ion in the pellet (B-12) was 140 ppm by mass, and the content of the radical cross-linking agent was 4% by mass.

Production Example 24: Production of Isocyanate Modified SBR Pellet (B-13)

After a nitrogen-replaced 5 L reaction vessel was charged with 2,000 g of cyclohexane, 450 g of 1,3-butadiene, 50 g of styrene and 25 g of tetra hydrofuran, 0.32 g of n-butyl lithium was added thereto to allow for a polymerization reaction adiabatically at 30 to 90° C. After the conversion rate of polymerization reached 100%, diphenyl methanediisocyanate was added in an amount of 2 equivalent with respect to n-butyl lithium to allow for the reaction. Furthermore, 0.7 g of di-tert-butyl-p-cresol was added as an anti-aging agent to 100 g of the polymer, and the solvent was removed to dry according to a common method.

The isocyanate modified SBR thus obtained was melt mixed with trimethylolpropane trimethacrylate as a radical cross-linking agent such that the content in the pellet became 4% by mass using a biaxial extruder at 230° C., and extruded. The strand thus obtained was cut to produce a pellet (chip) (B-13).

Production Example 25: Production of Isocyanate Modified BR Pellet (B-14)

After a nitrogen-replaced reaction vessel was charged with 2,000 g of cyclohexane, 500 g of butadiene and 10 g of tetra hydrofuran, n-butyl lithium was added thereto to allow for a polymerization reaction adiabatically at 30 to 90° C. After the conversion rate of polymerization reached 100%, diphenyl methanediisocyanate was added in an amount of 2 equivalent with respect to the lithium atom to allow for the reaction. Next, after 2,6-di-tertiary butyl-p-cresol was added, cyclohexane was removed by heating to give isocyanate modified BR.

The isocyanate modified BR thus obtained was melt mixed with trimethylolpropane trimethacrylate as a radical cross-linking agent such that the content in the pellet became 4% by mass using a biaxial extruder at 230° C., and extruded. The strand thus obtained was cut to produce a pellet (chip) (B-14).

Example 1

The EVOH pellet (A-1a) and the TPU pellet (B-1a) were supplied to a coextruder in molten states at 210° C. with a 33-layered feed block such that a multilayered structure was formed which included 16 layers A and 17 layers B alternately with the resin composition that constitutes each pellet, and coextruded to allow for interflowing, whereby a multilayer laminate was produced. The thickness of the channel of each layer was varied so as to gradually increase in the feed block from the front face side toward the middle side, whereby melts of the pellet (A-1a) and the pellet (B-1a) that interflowed were extruded such that the each layer of the extruded multilayered structure has a uniform thickness. In addition, a slit shape was designed so as to give an approximately the same thickness of the layer A and the layer B that are adjacent with each other. The laminate consisting of 25 layers in total thus obtained was maintained to have the surface temperature of 25° C., and solidified by rapid cooling on a casting drum which had been electrostatically applied. The cast film obtained by solidification by rapid cooling was subjected to compression bonding on an exfoliate paper, and then rolled. It should be noted that the channel shape and total amount of discharge were predetermined such that a time period of about 4 min elapsed from the interflow of the melts of the pellet (A-1a) and the pellet (B-1a) until the solidification by rapid cooling on the casting drum.

As a result of observation of a cross section of the cast film obtained as described above with DIGITAL MICROSCOPE VHX-900 (manufactured by KEYENCE Corporation) and an electron microscope VE-8800 (manufactured by KEYENCE Corporation), an average thickness of each layer A and layer B was 0.5 µm, and the thickness of the entirety was 12.5 µm. It is to be noted that each thickness was an average of measurements at randomly selected nine points.

Next, the cast film was irradiated with an electron beam at an accelerating voltage of 200 kV and an irradiation dose of 200 kGy using an electron beam accelerator (manufactured by NISSIN High Voltage Co., LTD. (currently Nissin Electric Co., Ltd.), model name "Curetron EB200-100") to obtain a multilayered structure.

Examples 2 to 41

Multilayered structures were produced in a similar manner to Example 1 except that the pellet type, the type and content of the additives in the pellet, lamination state, coextrusion molding temperature and predetermined dose of irradiation with the electron beam as shown in Table 2 to Table 5 were employed.

Note that in the case of Examples of the multilayered structure having at least 129 layers, each pellet was melted at 210° C. and passed through a gear pump and a filter, followed by supplying to a static mixer a laminate formed by allowing three layers to interflow in a feed block, whereby a laminate having layers alternately laminated in the thickness direction was obtained.

Comparative Example 1

Using the EVOH pellet (A-1a), and the TPU pellet (B-1a) as an elastomer, 3-layer film (TPU (B1a) layer/EVOH (A-1a) layer/TPU (B-1a) layer) was produced under the following coextrusion molding condition using a coextrusion device for three layers from two materials. The thickness of the EVOH (A-1a) layer was each 6.4 µm, and the thickness of the TPU (B-1a) layer was each 3.4 µm.

Next, the film was irradiated with an electron beam at an accelerating voltage of 200 kV and an irradiation dose of 200 kGy using an electron beam accelerator (manufactured by NISSIN High Voltage Co., LTD. (currently Nissin Electric Co., Ltd.), model name "Curetron EB200-100") to obtain a multilayered structure.

The coextrusion molding condition was as in the following.

Layer structure: TPU (B-1a)/EVOH (A-1a)/TPU (B-1a) (thickness (µm): 3.4/6.4/3.4)

Extrusion temperature of each resin: resin feed port/cylinder portion inlet/adaptor/die=170° C./170° C./220° C./220° C.

Specification of extruder of each resin:
  for TPU (B-1a): 25 mmφ extruder P25-18AC (manufactured by Osaka Seiki Kosaku K.K.)
  for EVOH (A-1a): 20 mmφ extruder (Laboratory-type) ME Model CO-EXT (manufactured by Toyo Seiki Co., Ltd.)

Specification of T die: for three layers from two materials; width of 500 mm (manufactured by Research Laboratory of Plastics Technology Co., Ltd.)

Temperature of cooling roller: 50° C.

Draw speed: 4 m/min

Comparative Examples 2 to 5

Multilayered structures were obtained in similar manners to Example 1 and Examples 39 to 41, respectively except that the electron beam was not irradiated.

Comparative Examples 6 to 8

Multilayered structures were produced in a similar manner to Comparative Example 1 except that the pellet type, the type and content of the additives in the pellet, lamination state, coextrusion molding temperature and predetermined dose of irradiation with the electron beam as shown in Table 5 were employed.

Evaluations

Various characteristics of the multilayered structures obtained in Examples 1 to 41 and Comparative Examples 1 to 8 were evaluated according to the following method. The results of the evaluations are shown in Table 2 to Table 5 together with details in connection with the layer A and the layer B.

(1) Gas Barrier Properties

Moisture conditioning of the multilayered structure obtained was carried out at 20° C. and 65% RH for 5 days, and two pieces of a sample of the conditioned multilayered structure were provided to measure the air transmission rate using MOCON, model OX-TRAN2/20 manufactured by Modern Controls, Inc., under a condition involving 20° C. and 65% RH in accordance with a method of JIS K7126 (isopiestic method). The average was then determined (unit: $mL/m^2 \cdot day \cdot atm$), and the value was represented in terms of an index relative to the average value in Comparative Example 1 which is assumed to be 100. Accordingly, the gas barrier properties were evaluated. The lower index value indicates superior gas barrier properties.

(2) Inter layer Peel Resistance

After heating at 180° C. for 15 min, moisture conditioning of the multilayered structure was carried out at 23° C. in an atmosphere of 50% RH for 7 days. Then inter layer peel resistance was determined in accordance with JIS-K6854 by T-Peel Test at a tension rate of 50 mm/min at 23° C. in an atmosphere of 50% RH.

(3) Evaluation with Laboratory Drum

Using the multilayered structure as an inner liner, a pneumatic tire for cars (195/65 R 15) as illustrated by the cross-sectional construction shown in FIG. 1 was produced according to a routine method.

(3-1) Presence/Absence of Cracks after Drum Driving Test

The tire produced as described above was run over 1,000 km on a drum rotating at a revolution number corresponding to a speed of 80 km/h under an air pressure of 140 kPa while being pressed under a load of 6 kN. The appearance of the inner liner of the tire after the running on the drum was visually observed to evaluate the presence/absence of cracks.

(3-2) Gas Barrier Properties after Drum Driving Test

Furthermore, a sidewall portion of the tire was cut away to give a size of 10 cm×10 cm, and subjected to moisture conditioning at 20° C. and 65% RH for 5 days. Two pieces of a sample of the conditioned slices of the sidewall portion of the tire were provided to measure the air transmission rate using MOCON, model OX-TRAN2/20 manufactured by Modern Controls, Inc., under a condition involving 20° C. and 65% RH in accordance with a method of JIS K7126 (isopiestic method). The average was then determined (unit: $mL/m^2 \cdot day \cdot atm$), and the value was represented in terms of an index relative to the average value of the air transmission rate of the sample of the multilayered structure in Comparative Example 1 which is assumed to be 100. Accordingly, the gas barrier properties were evaluated. The lower index value indicates superior gas barrier properties.

TABLE 2

| | | | | Comparative Example | | Example | | | | | | | | |
|---|---|---|---|---|---|---|---|---|---|---|---|---|---|---|
| | | | | 1 | 2 | 1 | 2 | 3 | 4 | 5 | 6 | 7 | 8 | 9 |
| Multi-layered Structure | Layer A | designation of pellet | | A-1a | A-1a | A-1a | A-1a | A-1a | A-2a | A-2a | A-2a | A-3 | A-3 | A-3 |
| | | additives in pellet | metal salt | absent | absent | absent | absent | absent | Zn (120) Na (130) | Zn (120) Na (130) | Zn (120) Na (130) | absent | absent | absent |
| | | | radical cross-linking agent | absent | absent | absent | absent | absent | absent | absent | absent | absent | absent | absent |
| | | average thickness (μm) | | 6.4 | 0.4 | 0.4 | 0.4 | 0.2 | 1.2 | 1.2 | 1.2 | 0.2 | 0.2 | 0.2 |
| | | number of layer | | 1 | 16 | 16 | 16 | 32 | 16 | 16 | 32 | 32 | 32 | 32 |
| | Layer B | designation of pellet | | B-1a | B-1a | B-1a | B-2a | B-2a | B-1a | B-2a | B-1b | B-2a | B-1b | B-2b |
| | | additives in pellet | metal salt | absent | absent | absent | Na (140) | Na (140) | absent | Na (140) | absent | Na (140) | absent | Na (140) |
| | | | radical cross-linking agent | absent | absent | absent | absent | absent | absent | absent | present | absent | present | present |
| | | average thickness (μm) | | 3.4 | 0.4 | 0.4 | 0.4 | 0.2 | 1.2 | 1.2 | 1.2 | 0.2 | 0.2 | 0.5 |
| | | number of layer | | 2 | 17 | 17 | 17 | 33 | 17 | 17 | 33 | 33 | 33 | 33 |
| | Total number of layers | | | 3 | 33 | 33 | 33 | 65 | 33 | 33 | 65 | 65 | 65 | 65 |
| | Thickness of the multi-layered structure (μm) | | | 13.2 | 13.2 | 13.2 | 13.2 | 13 | 39.6 | 39.6 | 78 | 13 | 13 | 22.9 |
| Dose of electron beam (kGy) | | | | 200 | 0 | 200 | 200 | 200 | 200 | 200 | 200 | 200 | 200 | 200 |
| Evaluation of characteristics | Gas barrier properties (index) | | | 100 | 91 | 85 | 82 | 80 | 211 | 206 | 98 | 27 | 25 | 21 |
| | Interlayer peel resistance (N/25 mm) | | | 14 | 0.5 | 200 | 260 | 280 | 255 | 285 | 300 | 250 | 290 | 310 |
| | Presence/absence of cracks after drum driving test | | | present | present | absent | absent | absent | absent | absent | absent | absent | absent | absent |

TABLE 2-continued

|  |  | Comparative Example | | Example | | | | | | | | |
|---|---|---|---|---|---|---|---|---|---|---|---|---|
|  |  | 1 | 2 | 1 | 2 | 3 | 4 | 5 | 6 | 7 | 8 | 9 |
| Gas barrier propeties after drum driving test (index) | | 54,000 | 29,120 | 391 | 262 | 192 | 465 | 351 | 157 | 597 | 474 | 198 |

TABLE 3

|  |  |  |  | Examples | | | | | | | |
|---|---|---|---|---|---|---|---|---|---|---|---|
|  |  |  |  | 10 | 11 | 12 | 13 | 14 | 15 | 16 | 17 |
| Multilayered Structure | Layer A | designation of pellet | | A-1a | A-1b | A-1b | A-2b | A-2b | A-1a | A-1a | A-1a |
| | | additives in pellet | metal salt | absent | absent | absent | Zn (120) Na (130) | Zn (120) Na (130) | absent | absent | absent |
| | | | radical cross-linking agent | absent | present | present | present | present | absent | absent | absent |
| | | average thickness (μm) | | 0.4 | 0.4 | 0.4 | 1.2 | 0.4 | 0.4 | 1.8 | 0.7 |
| | | number of layer | | 16 | 16 | 16 | 16 | 64 | 16 | 3 | 8 |
| | Layer B | designation of pellet | | B-3b | B-3a | B-3b | B-3b | B-3b | B-3a | B-2a | B-2a |
| | | additives in pellet | metal salt | Mg (110) | Mg (110) | Mg (110) | Mg (110) | Mg (110) | Mg (110) | Na (140) | Na (140) |
| | | | radical cross-linking agent | present | absent | present | present | present | absent | absent | absent |
| | | average thickness (μm) | | 0.4 | 0.4 | 0.4 | 1.2 | 0.4 | 0.4 | 1.8 | 0.8 |
| | | number of layer | | 17 | 17 | 17 | 17 | 65 | 17 | 4 | 9 |
| | Total number of layers | | | 33 | 33 | 33 | 33 | 129 | 33 | 7 | 17 |
| | Thickness of the multilayered structure (μm) | | | 13.2 | 13.2 | 13.2 | 39.6 | 51.6 | 13.2 | 12.6 | 12.8 |
| Dose of electron beam (kGy) | | | | 200 | 200 | 200 | 200 | 100 | 200 | 200 | 200 |
| Evaluation of characteristics | Gas barrier properties (index) | | | 80 | 95 | 91 | 225 | 160 | 85 | 114 | 109 |
| | Interlayer peel resistance (N/25 mm) | | | 285 | 340 | 365 | 380 | 395 | 250 | 200 | 200 |
| | Presence/absence of cracks after drum driving test | | | absent | absent | absent | absent | absent | absent | absent | absent |
| | Gas barrier propeties after drum driving test (index) | | | 184 | 209 | 191 | 315 | 224 | 272 | 4,720 | 760 |

|  |  |  |  | Examples | | | | | |
|---|---|---|---|---|---|---|---|---|---|
|  |  |  |  | 18 | 19 | 20 | 21 | 22 | 23 |
| Multilayered Structure | Layer A | designation of pellet | | A-1a | A-2b | A-1a | A-1a | A-1a | A-1a |
| | | additives in pellet | metal salt | absent | Zn (120) Na (130) | absent | absent | absent | absent |
| | | | radical cross-linking agent | absent | present | absent | absent | absent | absent |
| | | average thickness (μm) | | 0.1 | 3 | 0.05 | 0.03 | 0.02 | 0.4 |
| | | number of layer | | 64 | 64 | 128 | 256 | 512 | 16 |
| | Layer B | designation of pellet | | B-2a | B-2a | B-2a | B-2a | B-2a | B-2a |
| | | additives in pellet | metal salt | Na (140) | Na (140) | Na (140) | Na (140) | Na (140) | Na (140) |
| | | | radical cross- | absent | absent | absent | absent | absent | absent |

TABLE 3-continued

|  |  |  |  |  |  |  |  |
|---|---|---|---|---|---|---|---|
|  |  | linking agent |  |  |  |  |  |
|  |  | average thickness (μm) | 0.1 | 10 | 0.05 | 0.02 | 0.02 | 1.2 |
|  |  | number of layer | 65 | 65 | 129 | 257 | 513 | 17 |
|  | Total number of layers |  | 129 | 129 | 257 | 513 | 1025 | 33 |
|  | Thickness of the multilayered structure (μm) |  | 12.9 | 842 | 12.9 | 12.8 | 20.5 | 26.8 |
| Dose of electron beam (kGy) |  |  | 200 | 200 | 200 | 200 | 200 | 200 |
| Evaluation of characteristics | Gas barrier properties (index) |  | 80 | 23 | 80 | 67 | 50 | 85 |
|  | Interlayer peel resistance (N/25 mm) |  | 268 | 375 | 267 | 268 | 269 | 260 |
|  | Presence/absence of cracks after drum driving test |  | absent | absent | absent | absent | absent | absent |
|  | Gas barrier propeties after drum driving test (index) |  | 176 | 90 | 144 | 107 | 70 | 204 |

TABLE 4

|  |  |  |  | Example |  |  |  |  |  |  |  |  |  |  |  |
|---|---|---|---|---|---|---|---|---|---|---|---|---|---|---|---|
|  |  |  |  | 24 | 25 | 26 | 27 | 28 | 29 | 30 | 31 | 32 | 33 | 34 | 35 |
| Multi-layered Structure | Layer A | designation of pellet |  | A-1a | A-1a | A-1a | A-1a | A-1a | A-1a | A-1a | A-1a | A-1a | A-1a | A-1a | A-1a |
|  |  | additives in pellet | metal salt | absent | absent | absent | absent | absent | absent | absent | absent | absent | absent | absent | absent |
|  |  |  | radical cross-linking agent | absent | absent | absent | absent | absent | absent | absent | absent | absent | absent | absent | absent |
|  |  | average thickness (μm) |  | 0.4 | 0.4 | 0.4 | 0.4 | 0.4 | 0.4 | 0.4 | 0.4 | 0.4 | 0.4 | 0.4 | 0.4 |
|  |  | number of layer |  | 16 | 16 | 16 | 16 | 16 | 16 | 16 | 16 | 16 | 16 | 16 | 16 |
|  | Layer B | designation of pellet |  | B-4 | B-5 | B-6 | B-7 | B-8 | B-9 | B-10 | B-11 | B-12 | B-13 | B-14 | B-15 |
|  |  | additives in pellet | metal salt | Mg (110) | Mg (110) | Na (140) | Na (140) | Na (140) | Na (140) | Mg (110) | Mg (110) | Na (110) | absent | absent | absent |
|  |  |  | radical cross-linking agent | present | present | present | present | present | present | present | present | present | present | present | present |
|  |  | average thickness (μm) |  | 0.4 | 0.4 | 0.4 | 0.4 | 0.4 | 0.4 | 0.4 | 0.4 | 0.4 | 0.4 | 0.4 | 0.4 |
|  |  | number of layer |  | 17 | 17 | 17 | 17 | 17 | 17 | 17 | 17 | 17 | 17 | 17 | 17 |
|  | Total number of layers |  |  | 33 | 33 | 33 | 33 | 33 | 33 | 33 | 33 | 33 | 33 | 33 | 33 |
|  | Thickness of the multilayered structure (μm) |  |  | 13.2 | 13.2 | 13.2 | 13.2 | 13.2 | 13.2 | 13.2 | 13.2 | 13.2 | 13.2 | 13.2 | 13.2 |
| Dose of electron beam (kGy) |  |  |  | 200 | 200 | 200 | 200 | 200 | 200 | 200 | 200 | 200 | 200 | 200 | 200 |
| Evaluation of characteristics | Gas barrier properties (index) |  |  | 82 | 83 | 85 | 84 | 84 | 91 | 92 | 92 | 93 | 91 | 91 | 90 |
|  | Interlayer peel resistance (N/25 mm) |  |  | 210 | 206 | 222 | 215 | 228 | 241 | 180 | 195 | 203 | 212 | 220 | 178 |
|  | Presence/absence of cracks after drum driving test |  |  | absent | absent | absent | absent | absent | absent | absent | absent | absent | absent | absent | absent |
|  | Gas barrier propeties after drum driving test (index) |  |  | 256 | 264 | 251 | 256 | 242 | 248 | 335 | 309 | 300 | 281 | 271 | 331 |

TABLE 5

|  |  |  |  | Comparative Example ||||||
|---|---|---|---|---|---|---|---|---|---|
|  |  |  |  | 3 | 4 | 5 | 6 | 7 | 8 |
| Multilayered Structure | Layer A | designation of pellet | | A-4 | A-5 | A-6 | A-4 | A-5 | A-6 |
|  |  | additives in pellet | metal salt | absent | Sn (5) | absent | absent | Sn (5) | absent |
|  |  |  | radical cross-linking agent | absent | absent | absent | absent | absent | absent |
|  |  | average thickness (μm) | | 0.4 | 0.4 | 0.4 | 6.4 | 6.4 | 6.4 |
|  |  | number of layer | | 16 | 16 | 16 | 1 | 1 | 1 |
|  | Layer B | designation of pellet | | B-1b | B-1b | B-1b | B-1b | B-1b | B-1b |
|  |  | additives in pellet | metal salt | absent | absent | absent | absent | absent | absent |
|  |  |  | radical cross-linking agent | present | present | present | present | present | present |
|  |  | average thickness (μm) | | 0.4 | 0.4 | 0.4 | 3.4 | 3.4 | 3.4 |
|  |  | number of layer | | 17 | 17 | 17 | 2 | 2 | 2 |
|  | Total number of layers | | | 33 | 33 | 33 | 3 | 3 | 3 |
|  | Thickness of the multilayered structure (μm) | | | 13.2 | 13.2 | 13.2 | 13.2 | 13.2 | 13.2 |
| Coextrusion molding temperature (° C.) | | | | 255 | 234 | 223 | 255 | 234 | 223 |
| Dose of electron beam (kGy) | | | | 0 | 0 | 0 | 200 | 200 | 200 |
| Evaluation of characteristics | Gas barrier properties (index) | | | 250 | 57 | 25 | 270 | 60 | 27 |
|  | Interlayer peel resistance (N/25 mm) | | | 0.6 | 0.4 | 0.3 | 14.5 | 12.8 | 11.2 |
|  | Presence/absence of cracks after drum driving test | | | present | present | present | present | present | present |
|  | Gas barrier propeties after drum driving test (index) | | | 56,000 | 21,888 | 14,400 | 102,060 | 38,880 | 26,244 |

|  |  |  |  | Example ||||||
|---|---|---|---|---|---|---|---|---|---|
|  |  |  |  | 36 | 37 | 38 | 39 | 40 | 41 |
| Multilayered Structure | Layer A | designation of pellet | | A-4 | A-5 | A-6 | A-4 | A-5 | A-6 |
|  |  | additives in pellet | metal salt | absent | Sn (5) | absent | absent | Sn (5) | absent |
|  |  |  | radical cross-linking agent | absent | absent | absent | absent | absent | absent |
|  |  | average thickness (μm) | | 0.4 | 0.4 | 0.4 | 0.4 | 0.4 | 0.4 |
|  |  | number of layer | | 16 | 16 | 16 | 16 | 16 | 16 |
|  | Layer B | designation of pellet | | B-2b | B-2b | B-2b | B-1b | B-1b | B-1b |
|  |  | additives in pellet | metal salt | Na (140) | Na (140) | Na (140) | absent | absent | absent |
|  |  |  | radical cross-linking agent | present | present | present | present | present | present |
|  |  | average thickness (μm) | | 0.4 | 0.4 | 0.4 | 0.4 | 0.4 | 0.4 |
|  |  | number of layer | | 17 | 17 | 17 | 17 | 17 | 17 |
|  | Total number of layers | | | 33 | 33 | 33 | 33 | 33 | 33 |
|  | Thickness of the multilayered structure (μm) | | | 13.2 | 13.2 | 13.2 | 13.2 | 13.2 | 13.2 |
| Coextrusion molding temperature (° C.) | | | | 255 | 234 | 223 | 255 | 234 | 223 |
| Dose of electron beam (kGy) | | | | 200 | 200 | 200 | 200 | 200 | 200 |
| Evaluation of characteristics | Gas barrier properties (index) | | | 220 | 50 | 22 | 240 | 54 | 24 |
|  | Interlayer peel resistance (N/25 mm) | | | 297 | 264 | 221 | 235 | 221 | 202 |
|  | Presence/absence of cracks after drum driving test | | | absent | absent | absent | absent | absent | absent |

TABLE 5-continued

| | | | | | | |
|---|---|---|---|---|---|---|
| Gas barrier propeties after drum driving test (index) | 634 | 168 | 88 | 845 | 251 | 100 |

In Tables, values in parentheses in the columns of "metal salt" in the pellet indicate the content of the metal element constituting the metal salt, and is represented by the unit of ppm by mass.

As is clear from Tables 2 to 5, when a metal salt is included in either the layer A or the layer B, or in both of these layers, the inter layer peel resistance is improved in comparison with those not including a metal salt in any of these layers. In addition, in the case in which a radical cross-linking agent is included in any of the layers, the inter layer peel resistance is improved as compared with the case in which the radical cross-linking agent and the metal salt are not included in both layers. In particular, superior peel resistance is attained when a metal salt is included in both layers and further a radical cross-linking agent is included in one of the layers.

On the other hand, it was revealed that the multilayered structure of each Comparative Example having a three-layer structure or not being irradiated with an electron beam exhibited inferior inter layer adhesion strength, and insufficient flex resistance.

INDUSTRIAL APPLICABILITY

The multilayered structure of the present invention is superior in gas barrier properties, flex resistance and the like, and thus suitably used as various types of films for which gas barrier properties are required, and particularly as inner liners of pneumatic tires.

EXPLANATION OF THE REFERENCE SYMBOLS 1 bead core
2 carcass layer
3 inner liner
4 belt layer
5 tread layer
6 side wall layer
7 bead filler

The invention claimed is:
1. A multilayered structure comprising:
a layer A comprising a resin composition comprising a gas barrier resin; and
a layer B being adjacent to the layer A and comprising a resin composition comprising an elastomer,
a total number of the layer A and the layer B being at least 17,
an average thickness of the layer A in terms of a single layer being no less than 0.02 μm and no greater than 3 μm, and an average thickness of the layer B in terms of a single layer being no less than 0.02 μm and no greater than 10 μm,
the multilayered structure being formed by irradiating with an active energy ray,
the layer A comprising only the gas barrier resin as a polymer, and
the gas barrier resin having an oxygen transmission rate of no greater than 100 mL·20 μm/(m²·day·atm) as determined according to a method described in JIS-K7126 (isopiestic method) under conditions including 20° C. and 65% RH.

2. The multilayered structure of claim 1, wherein the layer A and the layer B are alternately laminated.

3. The multilayered structure of claim 1, having a thickness of no less than 0.1 μm and no greater than 1,000 μm.

4. The multilayered structure of claim 1, wherein the elastomer is a polystyrene based elastomer, a polyolefin based elastomer, a polydiene based elastomer, a polyvinyl chloride based elastomer, a chlorinated polyethylene based elastomer, a polyurethane based elastomer, a polyester based elastomer, a polyamide based elastomer, a fluorocarbon resin based elastomer, or a combination thereof.

5. The multilayered structure of claim 1, wherein
the resin composition in at least one of the layer A and the layer B comprises a metal salt, and
a content of the metal salt is no less than 1 ppm by mass and no greater than 10,000 ppm by mass in a value of metal element.

6. The multilayered structure of claim 1, wherein
the resin composition in at least one of the layer A and the layer B comprises a radical cross-linking agent, and
a content of the radical cross-linking agent with respect to the resin composition before irradiation with an active energy ray is no less than 0.01% by mass and no greater than 10% by mass.

7. The multilayered structure of claim 1, wherein the gas barrier resin is an ethylene-vinyl alcohol copolymer.

8. The multilayered structure of claim 7, wherein a content of ethylene unit of the ethylene-vinyl alcohol copolymer is no less than 3 mol % and no greater than 70 mol %.

9. The multilayered structure of claim 7, wherein a degree of saponification of the ethylene-vinyl alcohol copolymer is no less than 80 mol %.

10. The multilayered structure of claim 7, wherein the ethylene-vinyl alcohol copolymer comprises a structural unit represented by the following formula (I):

wherein, $R^1$, $R^2$ and $R^3$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein two among $R^1$, $R^2$ and $R^3$ may bind with one another unless the two among $R^1$, $R^2$ and $R^3$ both represent a hydrogen atom, and wherein the aliphatic hydrocarbon group having 1 to 10 carbon atoms, the alicyclic hydrocarbon group having 3 to 10 carbon atoms or the aromatic hydrocarbon group having 6 to 10 carbon atoms may have a hydroxyl group, a carboxyl group or a halogen atom, a structural unit represented by the following formula (II):

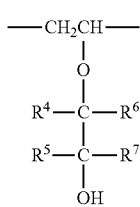

wherein, $R^4$, $R^5$, $R^6$ and $R^7$ each independently represent a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms or a hydroxyl group, wherein $R^4$ and $R^5$ or $R^6$ and $R^7$ may bind with one another unless both $R^4$ and $R^5$ or both $R^6$ and $R^7$ represent a hydrogen atom, and wherein the aliphatic hydrocarbon group having 1 to 10 carbon atoms, the alicyclic hydrocarbon group having 3 to 10 carbon atoms or the aromatic hydrocarbon group having 6 to 10 carbon atoms may have a hydroxyl group, an alkoxy group, a carboxyl group or a halogen atom, or a combination of these structural units, and wherein a content of the structural unit (I) or (II) with respect to the entire structural units is no less than 0.5 mol % and no greater than 30 mol %.

11. The multilayered structure of claim 1, wherein the active energy ray is an electron beam.

12. The multilayered structure of claim 11, wherein the electron beam is irradiated by an electron beam accelerator at an accelerating voltage of no less than 100 kV and no greater than 500 kV, and at an irradiation dose of no less than 5 kGy and no greater than 600 kGy.

13. The multilayered structure of claim 1, wherein an interlayer peel resistance as determined after heating at 180° C. for 15 min, by a T-shape peel test in accordance with JIS-K6854 at 23° C. in an atmosphere of 50% RH, at a tension rate of 50 mm/min is no less than 25 N/25 mm.

14. An inner liner for pneumatic tires, comprising the multilayered structure of claim 1.

15. A pneumatic tire, comprising the inner liner of claim 14.

16. The multilayered structure of claim 1, wherein the average thickness of the layer A in terms of a single layer is from 0.02 µm to 1.8 µm, and the average thickness of the layer B in terms of a single layer is from 0.02 µm to 1.8 µm.

17. The multilayered structure of claim 1, wherein the total number of the layer A and the layer B is at least 33.

18. The multilayered structure of claim 1, wherein a ratio of the average thickness of the layer B in terms of a single layer to the average thickness of the layer A in terms of a single layer (layer B/layer A) is no less than 2.

* * * * *